(12) United States Patent
Saeki

(10) Patent No.: US 6,893,078 B2
(45) Date of Patent: May 17, 2005

(54) FRONT BODY STRUCTURE FOR VEHICLE

(75) Inventor: Hidetsugu Saeki, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/286,909

(22) Filed: Nov. 4, 2002

(65) Prior Publication Data

US 2003/0090127 A1 May 15, 2003

(30) Foreign Application Priority Data

| Nov. 13, 2001 | (JP) | P2001-347573 |
| Dec. 5, 2001 | (JP) | P2001-371704 |
| Dec. 5, 2001 | (JP) | P2001-371738 |

(51) Int. Cl.[7] ............................................. B62D 25/08
(52) U.S. Cl. ........................ 296/187.09; 296/187.1; 296/203.02
(58) Field of Search .................. 296/187.03, 187.09, 296/187.1, 193.09, 203.01, 203.02, 205

(56) References Cited

U.S. PATENT DOCUMENTS

| 3,831,997 A | * | 8/1974 | Myers ................... 296/187.09 |
| 4,194,763 A | * | 3/1980 | Reidelbach et al. ........ 280/784 |
| 4,560,198 A | * | 12/1985 | Katano et al. ............. 296/185 |
| 4,702,515 A | * | 10/1987 | Kato et al. .............. 296/187.01 |
| 5,314,229 A | * | 5/1994 | Matuzawa et al. ..... 296/187.09 |
| 5,419,416 A | | 5/1995 | Miyashita et al. |
| 5,431,445 A | * | 7/1995 | Wheatley .................... 280/784 |
| 5,876,078 A | * | 3/1999 | Miskech et al. ............. 293/133 |
| 5,913,565 A | * | 6/1999 | Watanabe ............... 296/187.03 |
| 6,099,071 A | * | 8/2000 | Kasuga et al. .............. 296/205 |
| 6,170,906 B1 | * | 1/2001 | Kasuga .................. 296/203.02 |
| 6,193,303 B1 | * | 2/2001 | Urushiyama et al. .. 296/187.03 |
| 6,367,868 B1 | * | 4/2002 | Larsson et al. ........ 296/187.03 |

| 2001/0022444 A1 | 9/2001 | Lapic |

FOREIGN PATENT DOCUMENTS

| EP | 1 133 428 | 6/2000 |
| EP | 1 149 756 | 10/2001 |
| JP | 61-67281 | 5/1986 |
| JP | 62-52081 | 3/1987 |
| JP | 63-166855 | 10/1988 |
| JP | 4-50083 | 2/1992 |
| JP | 5-139242 | 6/1993 |
| JP | 7-101354 | 4/1995 |
| JP | 7-228267 | 8/1995 |
| JP | H9-142233 | 6/1997 |
| JP | 11-78977 | 3/1999 |
| JP | 11-255146 | 9/1999 |
| JP | 2000-38159 | 2/2000 |
| JP | 2000-53019 | 2/2000 |
| JP | 2001-63495 | 3/2001 |
| JP | 2001-63626 | 3/2001 |
| JP | P2001-158377 A | 6/2001 |

* cited by examiner

*Primary Examiner*—D. Glenn Dayoan
*Assistant Examiner*—Patricia L. Engle
(74) *Attorney, Agent, or Firm*—McDermott Will & Emery LLP

(57) ABSTRACT

A front body structure includes a pair of side members 11 and a strength adjusting mechanism 50 arranged on a forward area 11F of each side member 11. By the strength adjusting mechanism 50, it is established that a maximum stress generated in a front part of each one of imaginary sections Ia–Ie continuing in the longitudinal direction of the forward area 11F becomes more than or close to a maximum stress generated in a rear part of the each one of imaginary sections. As a result, when the collision load is inputted to the front end of the side member 11 obliquely from the front, a collapse is induced from the front end of the forward area 11F toward the rear. Then, the collapse is transmitted to the rear part of the area 11F continuously, enhancing the absorbing efficiency of the collision energy.

21 Claims, 33 Drawing Sheets

COMPRESSION SIDE: POSITIVE (+)

though a side member is shown with a strength adjusting mechanism with that of the fifth embodiment of the invention.

FRONT BODY STRUCTURE FOR VEHICLE

BACKGROUND OF THE INVENTION

The present invention relates to a front body structure for a vehicle. Japanese Patent Application Laid-open No. 2001-158377 discloses one front body structure for a vehicle, which is designed so as to absorb collision energy by axially collapsing side members on the front side of the vehicle.

In the front body structure, the side members are shaped to have polygonal sections respectively. For purposes of absorption of the collision energy, each side member is provided, on its front wall, with a bead which promotes an axial collapse of the side member when an axial input acts on the side member.

SUMMARY OF THE INVENTION

The above-mentioned front body structure can perform the absorption of energy effectively against a collision load inputted to the side member in the axial direction. However, if a collision load is applied on the side member obliquely from the front, then the front part of the side member is apt to be folded from its root.

Therefore, the collision energy at such an oblique collision can be temporarily absorbed since the front part of the side member is folded. Nevertheless, by this front body structure, it is difficult to attain a load characteristics allowing of continuous absorption of the collision energy due to the axial collapse of the side member.

In order that the only folding of the front part of the side member attains the characteristics to absorb the collision energy sufficiently, it is required to enhance the rigidity of the side member considerably. In this view, the requirement is apt to produce a measure to thicken the thickness of the side member. However, there is the possibility of causing the weight of a vehicle body to be increased remarkably.

In such a situation, it is an object of the present invention to provide a front body structure that could collapse a front end of the side member in the axial direction certainly even if the collision load were exerted on the side member from its front in any direction (including an oblique direction), thereby enhancing the absorbing efficiency of the collision energy.

According to the present invention, the above-mentioned object is accomplished by a front body structure for a vehicle, comprising:

a pair of side members arranged on both sides of a front compartment of the vehicle to extend in a fore-and-aft direction of the vehicle, the side members each including a reinforcement part for supporting a vehicle unit component; and a strength adjusting mechanism arranged in a forward area in front of the reinforcement part, for adjusting respective maximum stresses generated in both front part and rear part of each one of imaginary sections continuing in the longitudinal direction of the side member.

According to the present invention, there is also provided a front body structure for a vehicle, comprising:

a pair of side members arranged on both sides of a front compartment of the vehicle to extend in a fore-and-aft direction of the vehicle, each of the side members including a reinforcement part for supporting a vehicle unit component; and a strength adjusting mechanism for adjusting a strength of the side member so that a maximum stress generated in a front part of each one of imaginary sections continuing in the longitudinal direction of the side member becomes more than or close to a maximum stress generated in a rear part of the each one of imaginary sections, the strength adjusting mechanism being arranged in a forward area in front of the reinforcement part of each of the side members.

BRIEF DESCRIPTION OF THE DRAWINGS

FIGS. 5A and 5B are views explaining a strength adjusting mechanism in the first embodiment of the invention, in which FIG. 5A shows an input model of a collision load on the strength adjusting mechanism and FIG. 5B shows a distribution of stress in the strength adjusting mechanism;

FIGS. 9A and 9B are views showing respective deformation modes of the side member, in which FIG. 9A shows the deformation mode at the head-on collision and FIG. 9B shows the deformation mode at the oblique-front collision;

FIGS. 10A and 10B are respective graphs each showing the relationship between energy absorption and time in both cases of head-on collision and oblique-front collision, in which FIG. 10A shows the relationship of the side member of the earlier technology and FIG. 10B shows the relationship of the side member of the first embodiment of the invention;

FIGS. 32A and 32B are views explaining a strength adjusting mechanism in the eighth embodiment of the invention, in which FIG. 32A shows an input model of a collision load on the strength adjusting mechanism and FIG. 32B shows a distribution of stress in the strength adjusting mechanism;

DESCRIPTION OF THE PREFERRED EMBODIMENTS

Figure 1:
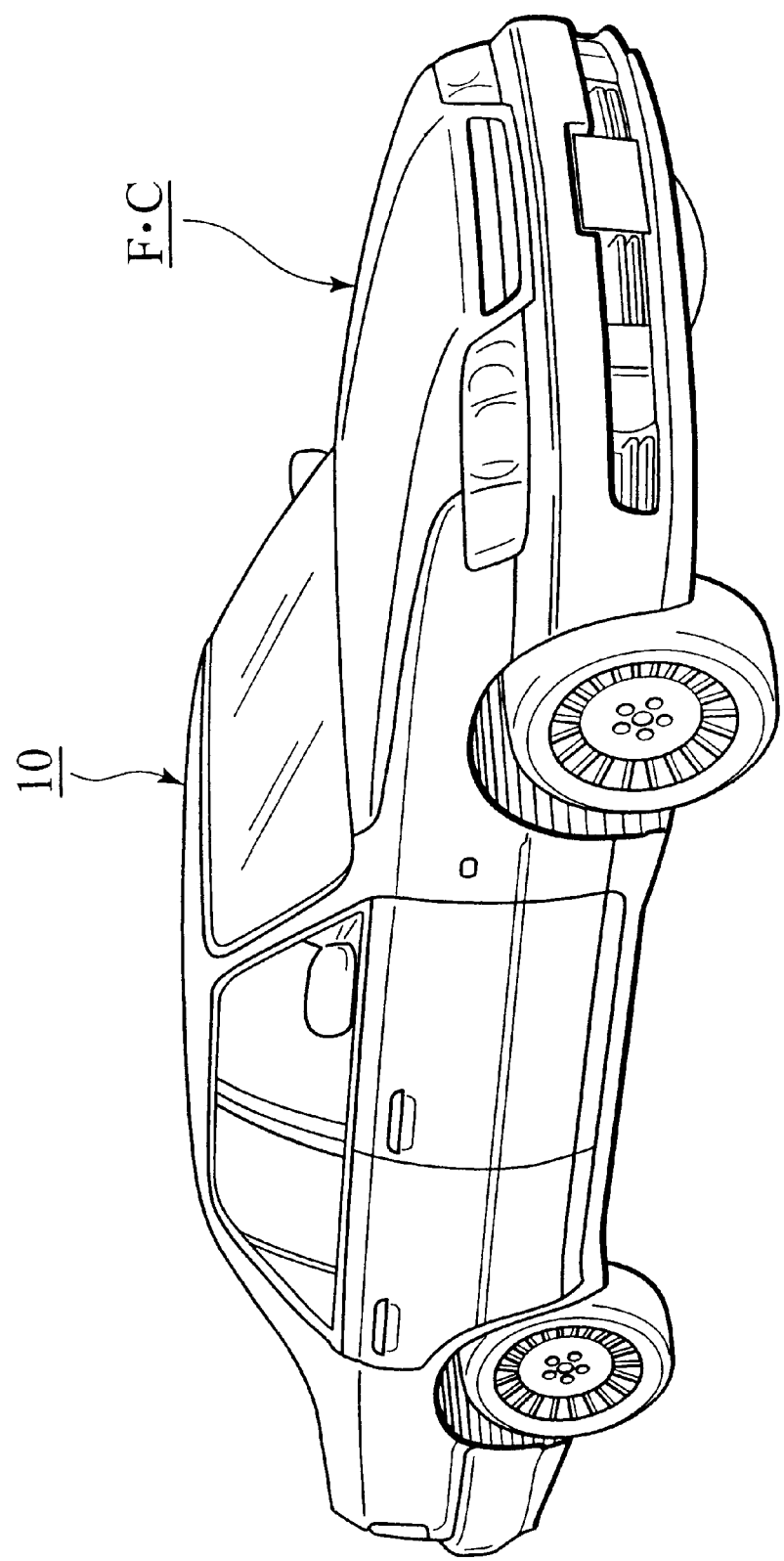
FIG. 1 is a perspective view of an automobile to which the present invention is applied.

Referring to accompanying drawings, various embodiments of the present invention will be described below.

[1st. Embodiment]

FIGS. 1 to 10 show the first embodiment of the front body structure in accordance with the present invention. The front body structure of the embodiment is applicable to a front compartment FC of a vehicle body 10 of FIG. 1. As representatively shown in FIG. 2, the front body structure includes a pair of side members (only one shown) 11 arranged on both (left-and-right) sides of the vehicle body 10 to extend in the fore-and-aft direction of the vehicle straight. The side members 11 are parallel with each other and have their front ends joined to a bumper reinforcement 12 forming a framework of a not-shown bumper.

Behind each side member 11, an extension side member 13 is formed in succession so as to extend from a dash panel 17 to the underside of a floor panel 18. Outside the side members 11 in the width direction of the vehicle, a pair of side sills 14 are arranged so as to be substantially parallel with the side members 11. On each side of the vehicle, the front end of the extension side member 13 is connected with the front end of the side sill 14 through an outrigger 15.

A dash cross member 16 is arranged so as to extend in the width direction of the vehicle. The dash cross member 16 has respective ends each connected with a joint between the side member 11 and the extension side member 13.

On each side of the vehicle the rear part of each side member 11, a suspension arm 21 for supporting a front wheel 20 is attached to the rear part of the side member 11 directly or indirectly through a not-shown suspension member etc. Between the left side member 11 and the right side member 11, a power unit 30 (e.g. engine unit) as a vehicle unit component is arranged and mounted on the members 11 through mount brackets 31.

Figure 3:
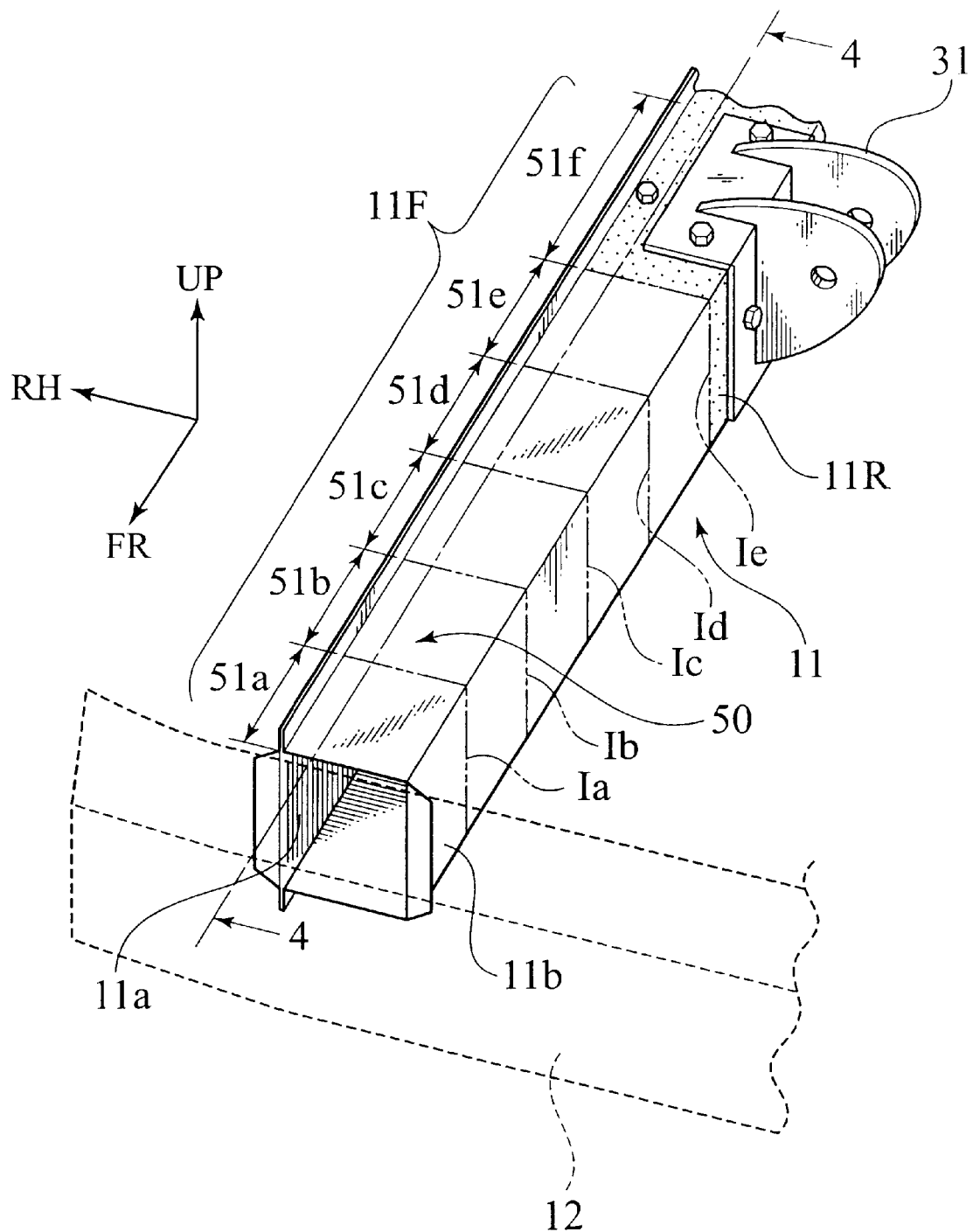
FIG. 3 is a perspective view of the forward area of a side member in accordance with the first embodiment of the invention.

As shown in FIG. 3, each side member 11 is provided, at its part for attachment with the mount bracket 31, with a reinforcement part 11R whose plate thickness is increased in comparison with the other parts of the member 11 (shown with a satin finished pattern in FIG. 3).

In detail, the side member 11 is formed so as to have a closed section. The closed section is provided by fixing a first plate 11a in the form of a flat band to a second plate 11b having a substantial U-shaped section. For example, this fixture is accomplished by spot-welding respective flanges on both sides of the second plate 11*b* to the first plate 11*a*. The reinforcement part 11R may be formed by welding a reinforcement plate (not shown) to the inner wall of the side member 11 constructed above.

According to this embodiment, the side member 11 is provided, at its forward area 11F in front of the reinforcement part 11R, with a strength adjusting mechanism by which it is established that the maximum stress generated in the front part of each one of imaginary sections Ia, Ib ... , Ie extending in the longitudinal direction of the member 11 is larger than or close to the maximum stress generated in the rear part of the corresponding section. In detail, the strength adjusting mechanism is embodied by a variable plate-thickness structure 50 which allows the plate thickness of the forward area 11F to be varied in the longitudinal direction of the side member 11.

Figure 4:
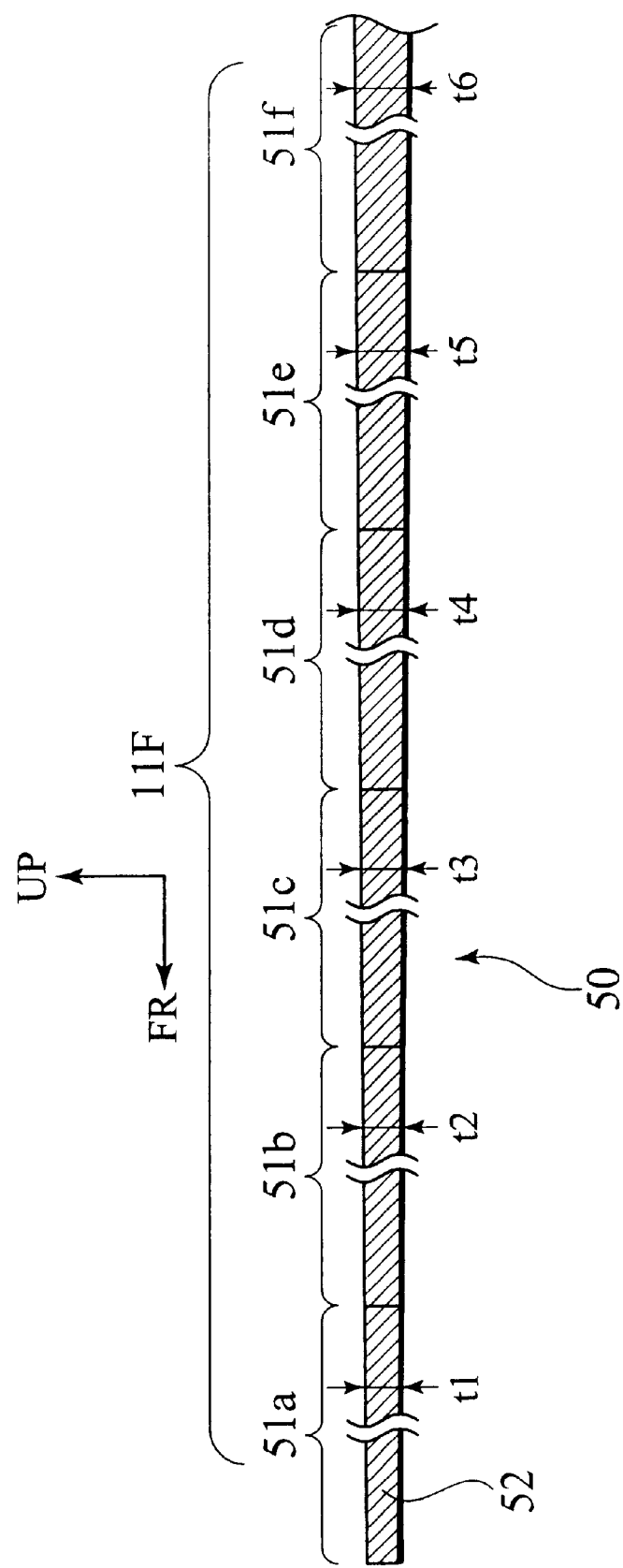
FIG. 4 is an enlarged sectional view taken along a line 4—4 of FIG. 3.

More in detail, the variable plate-thickness structure 50 is formed by a composite panel member 52. FIG. 4 shows a part of the section of the composite panel member 52. This panel member 52 is produced by welding a plurality of constituent plate members 51*a*, 51*b*, 51*c*, 51*d*, 51*e*, 51*f* (FIG. 4) over the whole peripheries, in succession. In arrangement, the plate member 51*a* is positioned at the front end of the forward area 11F of the side member 11. Further, respective thicknesses t1, t2, t3, t4, t5, t6 of the members 51*a*, 51*b*, 51*c*, 51*d*, 51*e*, 51*f* are established so as to gradually change in accordance with the following relationship of:

$$t1 < t2 < t3 < t4 < t5 < t6$$

Therefore, the plate member 51*f* having the largest thickness corresponds to the reinforcement part 11R.

Figure 5A:
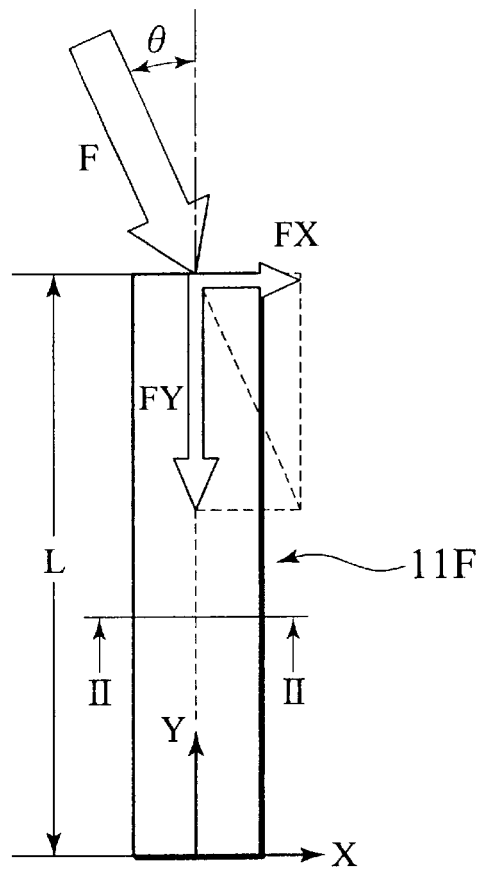
Figure 5B:
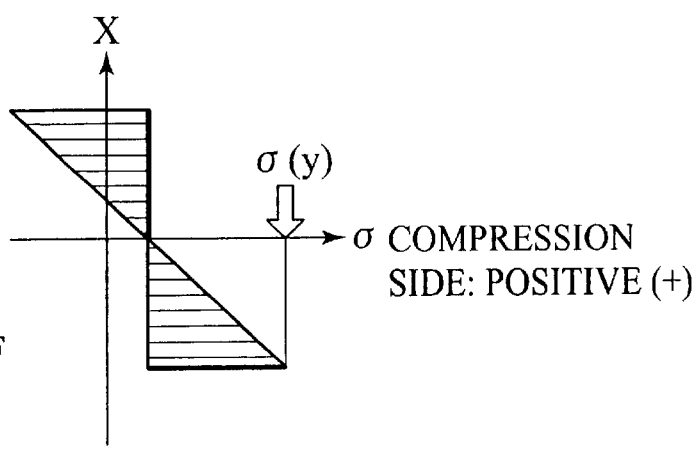

Additionally, the forward area 11F of the side member 11 is defined in the following relationship. As shown in FIGS. 5A and 5B, when a collision load F is statically exerted to the front end of the forward area 11F obliquely from the front, there is established, as to the maximum value of the sum of a stress of axial-force component (FY/A(y)) and a stress of moment component ({FX×(L−y)}/Z(y)) both generated in the respective imaginary sections Ia, Ib, ... , Ie (see FIG. 3), a relationship that the maximum value of front part of each imaginary section is nearly equal to that of the rear part of the same imaginary section (front part≈rear part). Furthermore, it is established that respective upper limits of the maximum values each coincides with a yield strength σ(y) of the constituent material of the side member 11, as shown by the following expression (1).

$$\sigma(y) = \{FY/A(y)\} + \{FX \times (L-y)\}/Z(y) \quad (1)$$

Figure 6:
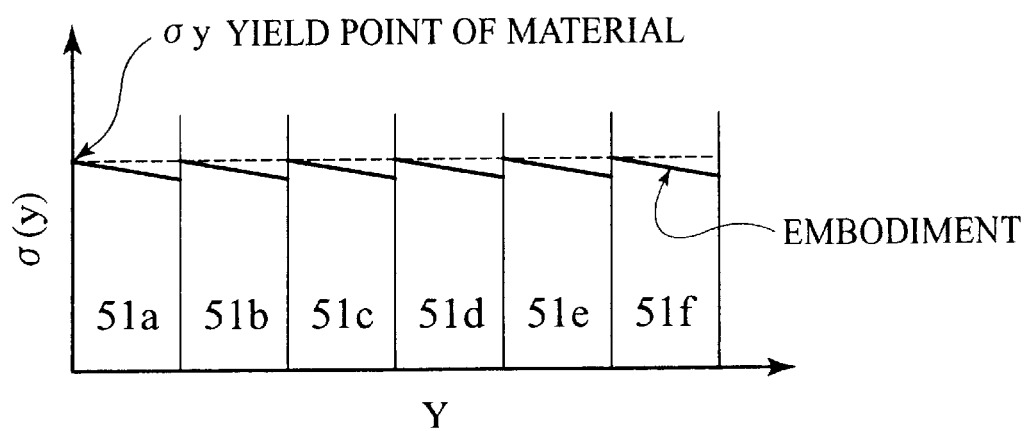
FIG. 6 is a stress-distribution diagram showing the concept of the strength adjusting mechanism in accordance with the first embodiment of the invention.

Then, the upper limit of the maximum stress in accordance with the variable plate-thickness structure 50 is established on the basis of the yield strength of the material forming the side member 11, as mentioned above. As a result, there can be obtained a distribution of the yield strength σ(y) with respect to the plate members 51*a*, 51*b*, 51*c*, 51*d*, 51*e*, 51*f*, as shown in FIG. 6.

(Effect)

Figure 7:
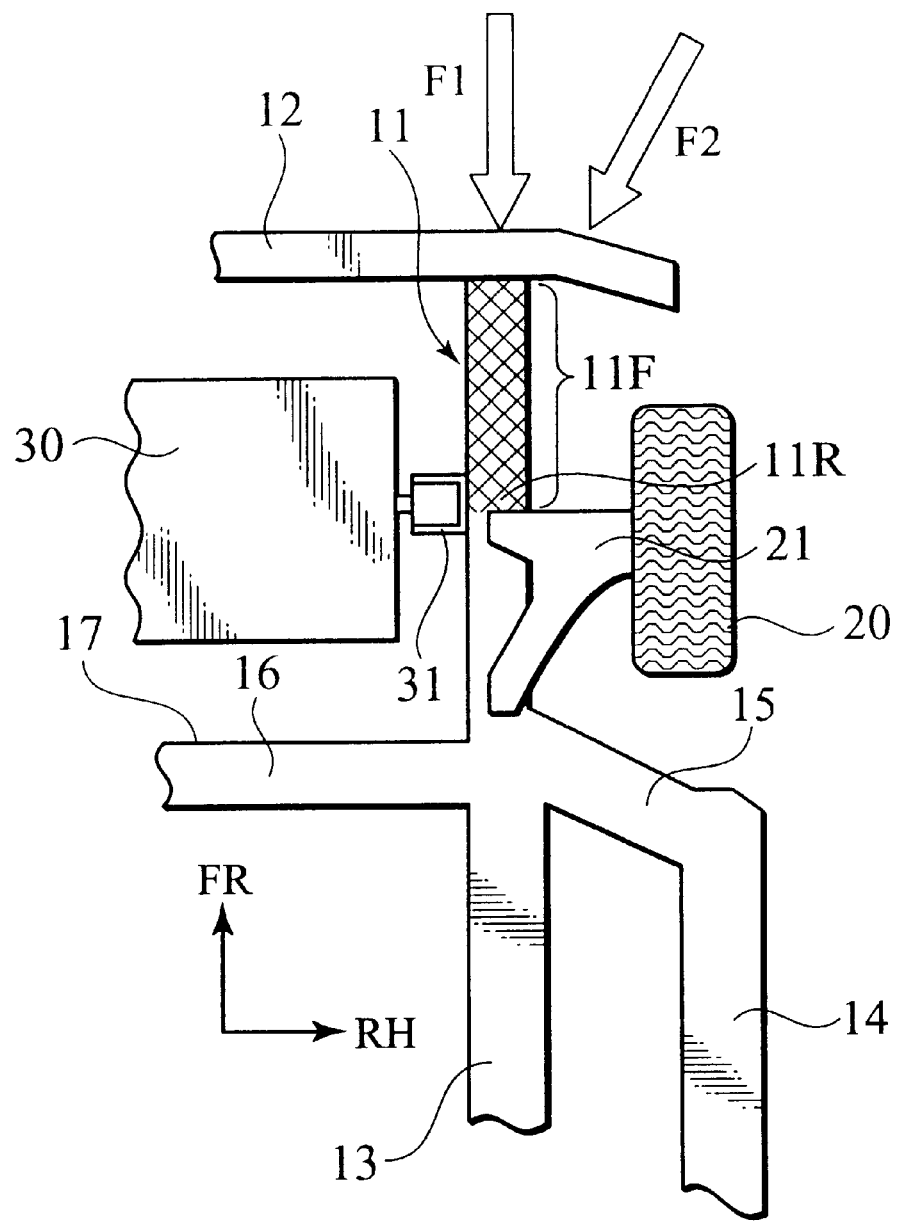
FIG. 7 is a schematic plan view showing an input model in both cases of head-on collision and oblique-front collision about the strength adjusting mechanism of the first embodiment.
Figure 8:
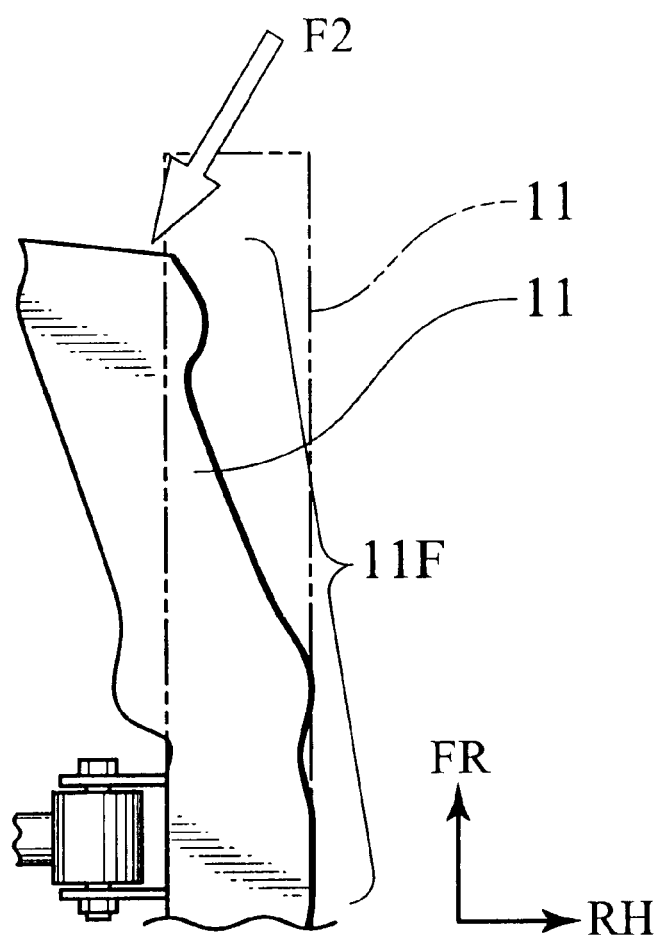
FIG. 8 is a view explaining a deformation mode of the side member in accordance with the earlier technology.

According to the front body structure of the first embodiment, when a static collision load F2 is exerted on the front end of the side member 11 obliquely from the front as shown in FIG. 7, there are established the above-mentioned relationships among respective properties of the yield strength σ(y), the stress FY/A(y), the stress {FX×X (L−y)}. Therefore, if the vehicle has a collision as one automotive dynamic phenomenon, then the front end (input point) of the side member 11 reaches the yielding area of the material to produce a plastic deformation. Consequently, when the collision load F2 is exerted to the side member 11 due to the oblique-and-front collision, the forward area 11F of the side member 11 is not deformed in the mode of FIG. 8 where the side member in the earlier technology is apt to be firstly folded at the root of the area 11F but deformed in the mode of FIG. 9B where the forward area 11F of the side member 11 induces a collapse K from the front end (as the input point) and subsequently, the collapse K is continuously transmitted toward the rear side, whereby a collision energy can be absorbed certainly.

Figure 9A:
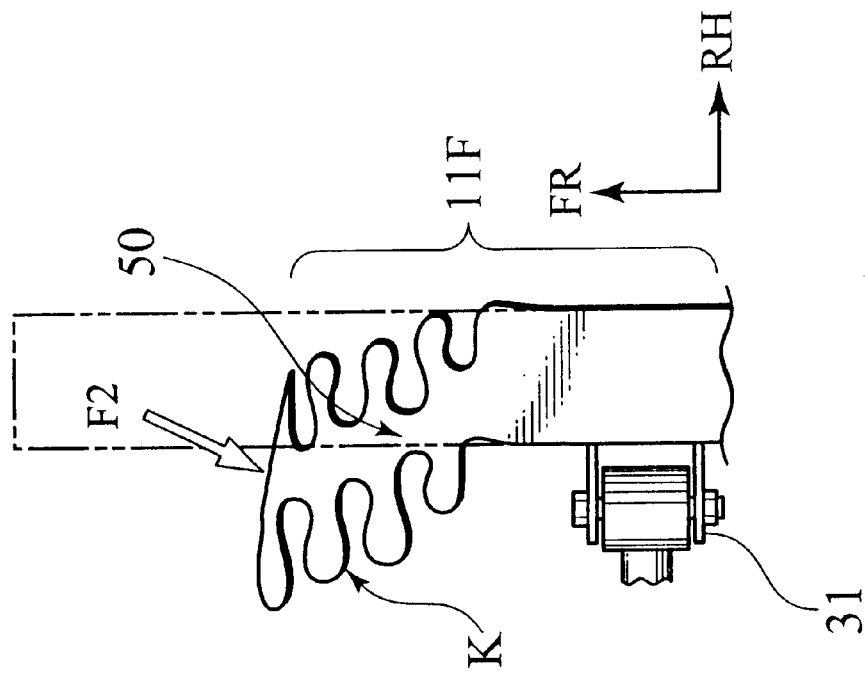
Figure 9B:
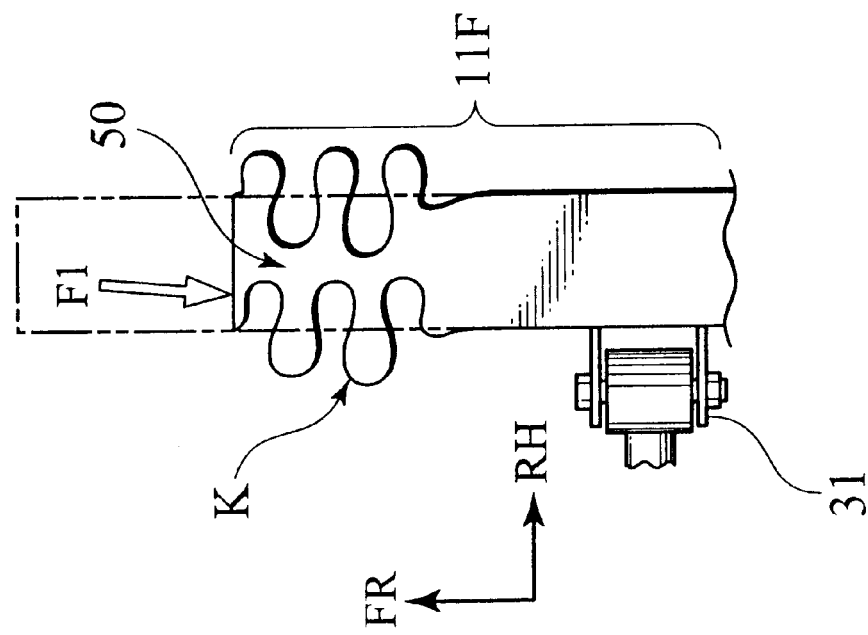

Note that, in this case, the forward area 11F of the side member 11 is subjected to the axial collapse K while being accompanied with a deviation from the root side of the member 11 to the inside (in the width direction of the vehicle) due to the application of a component of the collision load F2 to the member 11, as shown in FIG. 9B.

Additionally, since the rear end of the forward area 11F of the side member 11 is formed by the reinforcement part 11R for mounting the power unit 30, it is not necessary to reinforce the rear end of the forward area 11F owing to the utilization of the rigidity characteristics of the reinforcement part 11R, whereby it is possible to rationalize the structure of the side member 11 and also possible to make it compact.

Again, owing to the provision of the variable plate-thickness structure 50 in the forward area 11F, even if a frontal collision load F1 were applied to the front end of the side member 11 in the axial direction, the axial collapse K would be induced over the whole area of the forward area 11F, whereby the collision energy could be absorbed effectively, as shown in FIG. 9A.

Figure 10A:
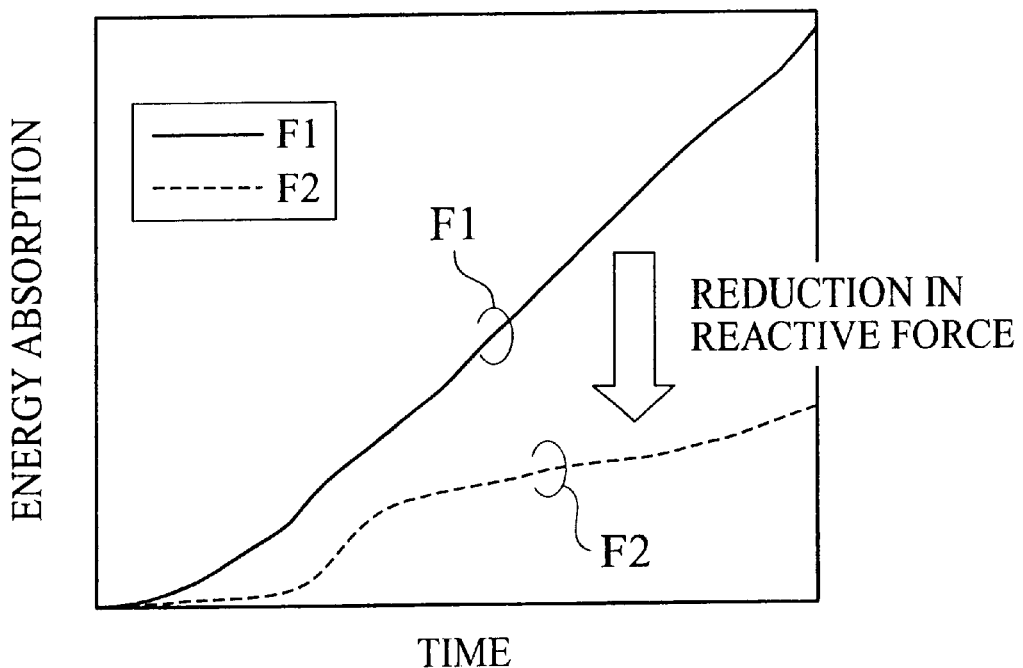
Figure 10B:
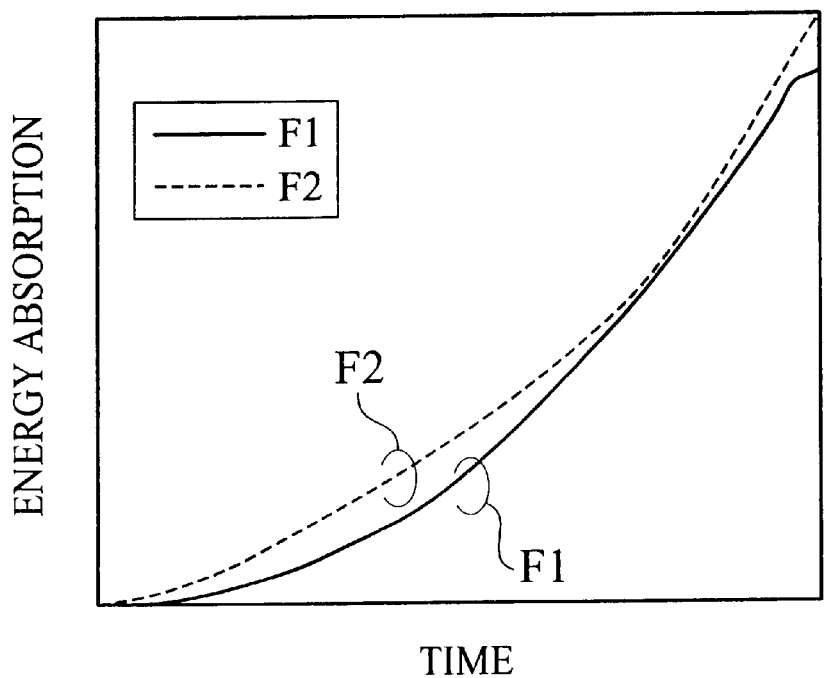

Therefore, since the variable plate-thickness structure 50 of the embodiment allows the frontal collision load F1 and the oblique-and-front collision F2 to produce the axial collapse K in the forward area 11F, it is possible to reduce a dispersion in absorbing the collision energy with respect to an input angle of the collision load F, accomplishing a stable energy absorption as shown in FIG. 10B. Note that the dispersion is often the case with the side member in the earlier technology, as shown in FIG. 10A.

According to the embodiment, since the variable plate-thickness structure 50 is formed by the composite panel member 52 which is obtained by welding the plural plate members 51*a*, 51*b*, 51*c*, 51*d*, 51*e*, 51*f* having different thicknesses t1, t2, t3, t4, t5, t6 in a manner that the thicknesses gradually change, it is possible to control the maximum stress generated in the imaginary sections Ia, Ib, ... , Ie extending in the longitudinal direction of the side member 11 approximately, whereby the collapse K from the front end of the forward area 11F can be induced with no hindrance and it is possible to form the forward area 11F with ease.

Further, since the variable plate-thickness structure 50 is provided by changing the sectional dimensions of the forward area 11F in the longitudinal direction of the side member 11, it is possible to easily control the maximum stress generated in the imaginary sections Ia, Ib, ... , Ie when the collision load F is applied to the front end of the side member 11. Thus, the variable plate-thickness structure 50 facilitates the adjustment of balance in strength, whereby the collapse K at the collision can be induced from the front end of the forward area 11F certainly.

As to the number of plate members 51*a*, ... , 51*f*, it is not limited to the number of this embodiment only. The number may be determined in accordance with the required collapse characteristics of the forward area 11F.

As to the maximum stress generated in the imaginary sections of the forward area 11F, although it is established that the maximum stress of the front part of each section is nearly equal to that of the rear part of the corresponding section (front part≈rear part) in the above-mentioned variable plate-thickness structure 50, the present invention is not limited to this embodiment only. Alternatively, it may be established that the maximum stress of the front part of each section is more than or close to that of the rear part of the corresponding section (front part≧rear part).

[2nd. Embodiment]

Figure 11:
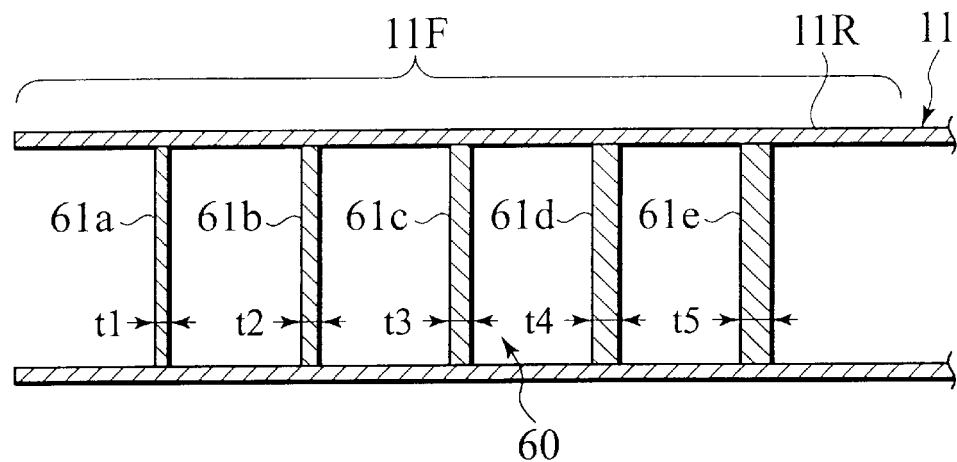
FIG. 11 is an enlarged sectional view of the forward area of the side member in accordance with the second embodiment of the invention.

FIG. 11 shows the second embodiment of the invention. In the second embodiment, elements similar to those of the first embodiment are indicated with the same reference numerals respectively and their overlapping descriptions are eliminated. FIG. 11 is an enlarged sectional view of the forward area of the side member.

In this embodiment, the strength adjusting mechanism of the invention is formed by a variable partition-thickness structure 60 of FIG. 11 In the variable partition-thickness structure 60, a plurality of partitions 61a, 61b, 61c, 61d, 61e are arranged in the closed section of the forward area 11F of the side member 11, at appropriate intervals in the longitudinal direction. Additionally, respective thicknesses t1, t2, t3, t4, t5 of the partitions 61a, 61b, 61c, 61d, 61e are established so as to gradually change in the longitudinal direction of the side member 11 with the following relationship of:

$$t1 < t2 < t3 < t4 < t5$$

The partitions 61a, 61b, 61c, 61d, 61e are secured with the inside wall of the side member 11 at the forward area 11F, into one body. Owing to the interposition of the partitions 61a, 61b, 61c, 61d, 61e in the side member 11, the rigidity of the side member 11 can be enhanced at the forward area 11F. Further, by adjusting the plate thicknesses t1, t2, t3, t4, t5 of the partitions 61a, 61b, 61c, 61d, 61e, it is possible to increase the rigidity of the side member 11 at will.

Then, the rigidity of the reinforcement part 11R mounting the power unit 30 (see FIG. 2) thereon can be ensured by the plate thickness t5 of the partition 61e. In the second embodiment, a plate thickness t of the circumferential wall of the side member 11 is established to be constant over the whole sections of the forward area 11F.

Therefore, according to the second embodiment of the invention, the maximum stress generated in the imaginary sections succeeding in the longitudinal direction of the forward area 11F when the collision load F is applied to the front end of the side member 11, can be controlled by the formation of the partitions 61a, 61b, 61c, 61d, 61e. Thus, the variable. partition-thickness structure 60 facilitates the adjustment of balance in strength, whereby the collapse K at the collision can be induced from the front end of the forward area 11F certainly, effecting the similar effects to the first embodiment.

Although the plate thickness t of the circumferential wall of the side member 11 is constant over the whole sections of the forward area 11F, the variable partition-thickness structure 60 of this embodiment may be combined with the afore-mentioned variable plate-thickness structure 50 of the first embodiment, providing the strength adjusting mechanism in one modification.

[3rd. Embodiment]

Figure 12:
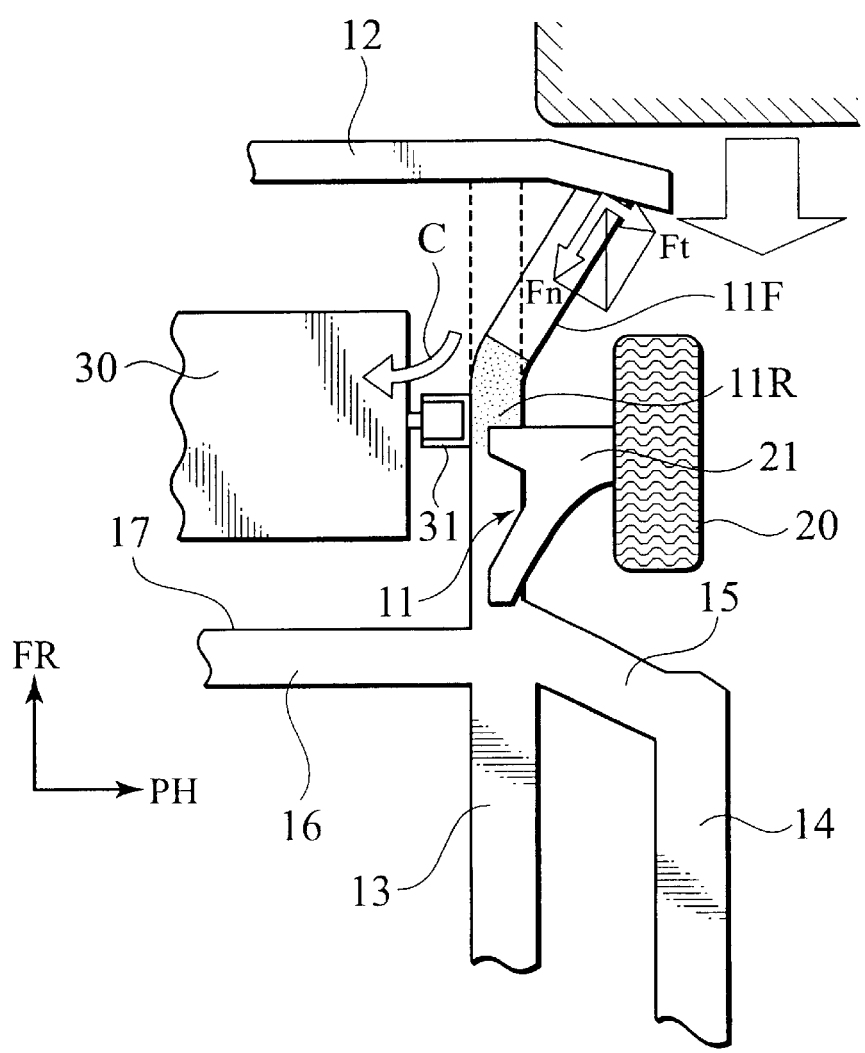
FIG. 12 is a schematic plan view showing the right framework structure of the front body structure in accordance with the third embodiment of the invention.
Figure 13:
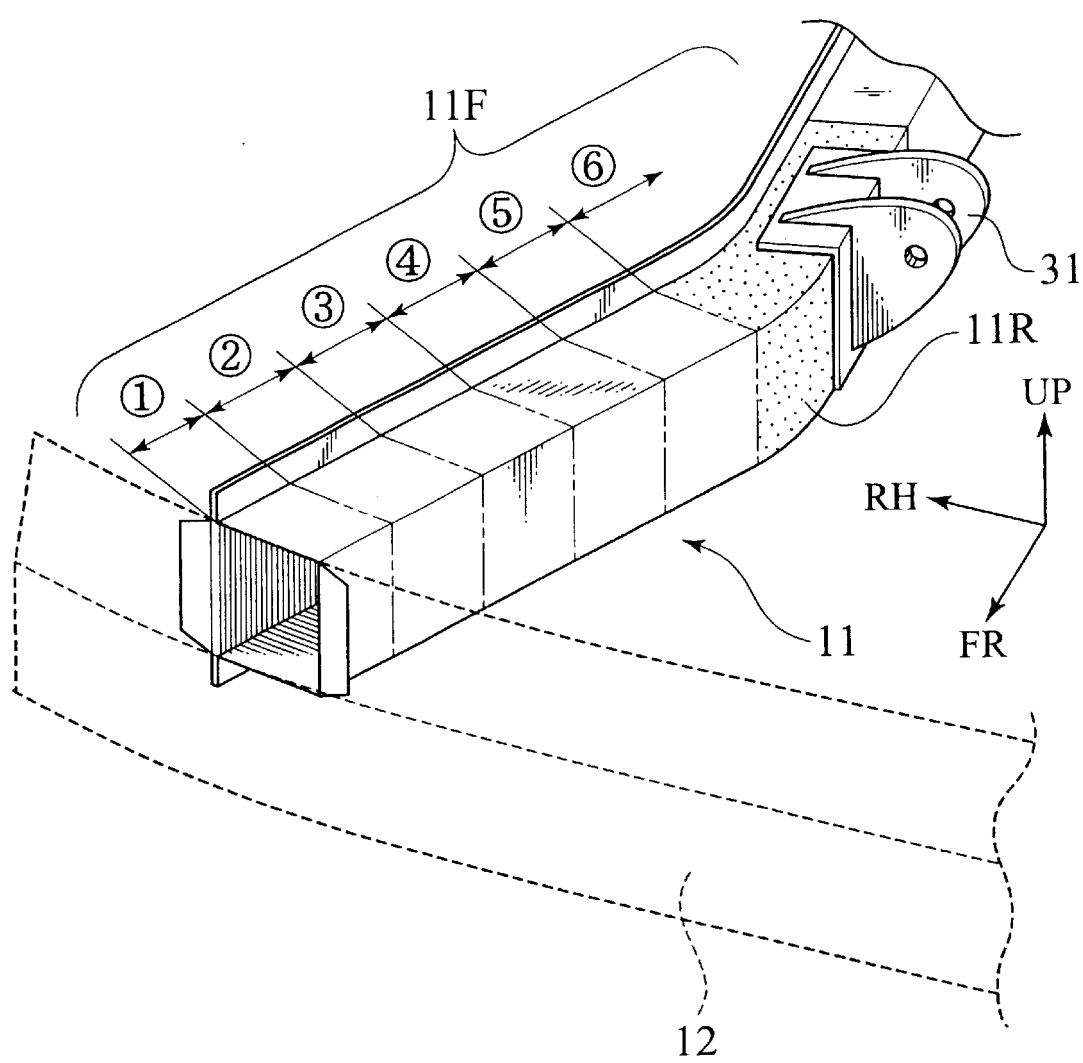
FIG. 13 is a perspective view of the forward area of the side member in accordance with the third embodiment of the invention.

FIGS. 12 and 13 show the third embodiment of the invention. In the third embodiment, elements similar to those of the first embodiment are indicated with the same reference numerals respectively and their overlapping descriptions are eliminated. FIG. 12 shows a framework structure on the right side of the front part of the vehicle schematically. FIG. 13 is a perspective view of the forward area of the side member.

According to the front body structure of this embodiment, as shown in FIGS. 12 and 13, the forward area 11F in front of the reinforcement part 11R of the side member 11 is inclined outward in the width direction of the vehicle as directing forward.

Note that, in this embodiment, the forward area 11F is also provided with the variable plate-thickness structure 50 of the first embodiment, providing the strength adjusting mechanism. Thus, respective sections ①to ⑥ are formed to have respective plate thicknesses gradually increased as approaching the reinforcement part 11R.

Owing to the above formation of the forward area 11F of the side member 11, it is possible to allow the frontal collision to collapse the forward area 11F from its front end continuously, to mention nothing of the oblique-and-front collision.

Additionally, since the outward inclination of the forward area 11F allows the front end of the side member 11 to be positioned on the outer side in the vehicle body, it is possible to enlarge an input-bearing range established at the vehicle front end, in the width direction of the vehicle.

FIG. 12 also shows one collision model which is hard to directly exert a collision load F on a straight side member shown with broken lines. While, in the slanted side member 11 (shown with solid lines) of this embodiment, since a component Fn of the collision load F is inputted to the forward area 11F of the side member 11, it is possible to absorb the collision energy appropriately.

Since the forward area 11F is inclined from the reinforcement part 11R outward in the width direction of the vehicle, when the side member 11 is subjected to the collision load F as shown in the figure, it is possible to establish a load-transmission route C where the collision load (component) is transmitted to the other reinforcement part (not shown) and the other side member (also not shown) through the mount bracket 31, the power unit 30 and the other mount bracket.(not shown), in order. That is, according to the embodiment, it is possible to disperse the collision load F to various components in the front part of the vehicle.

[4th. Embodiment]

Figure 14:
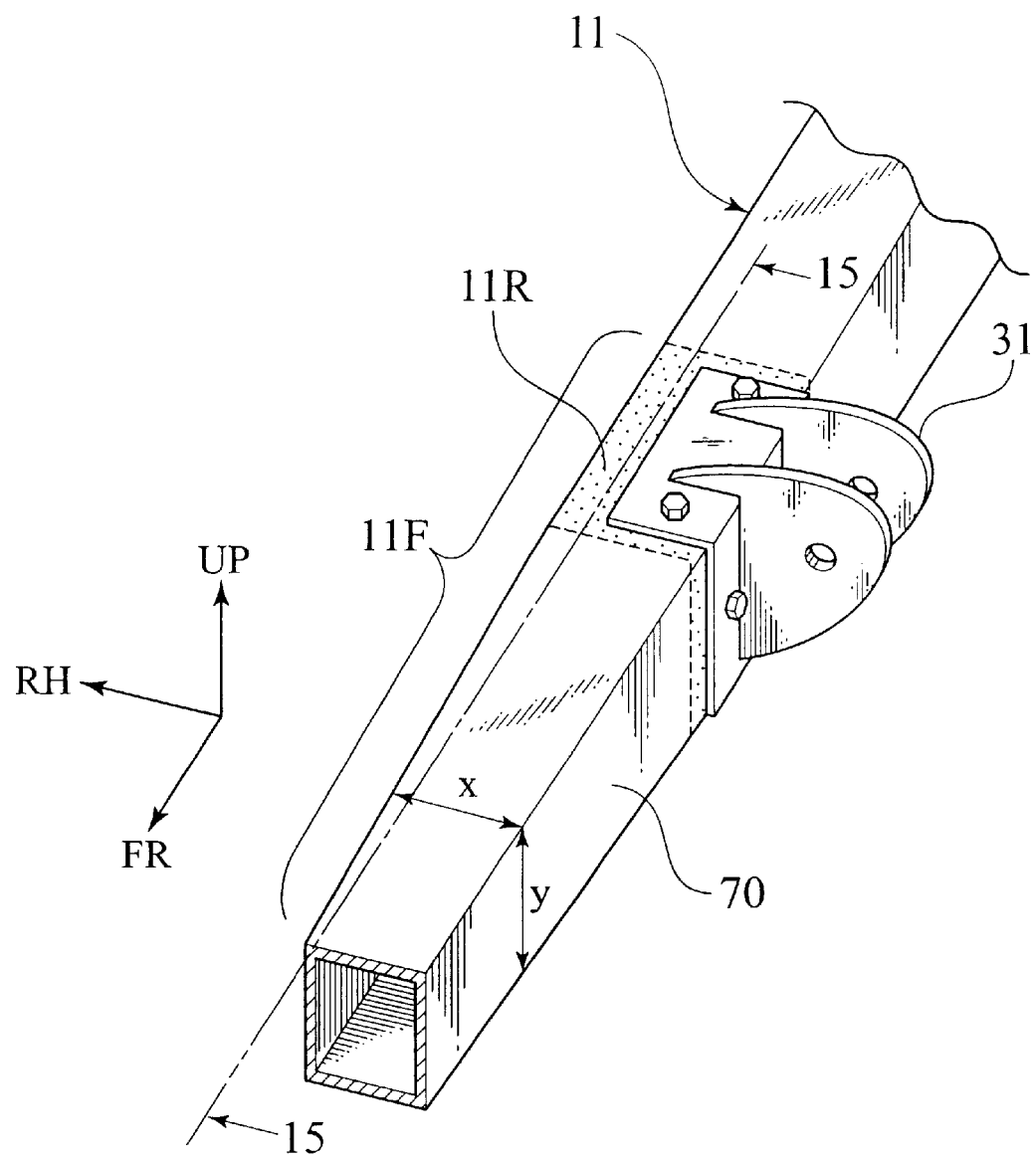
FIG. 14 is a perspective view of the forward area of the side member in accordance with the fourth embodiment of the invention.
Figure 15:
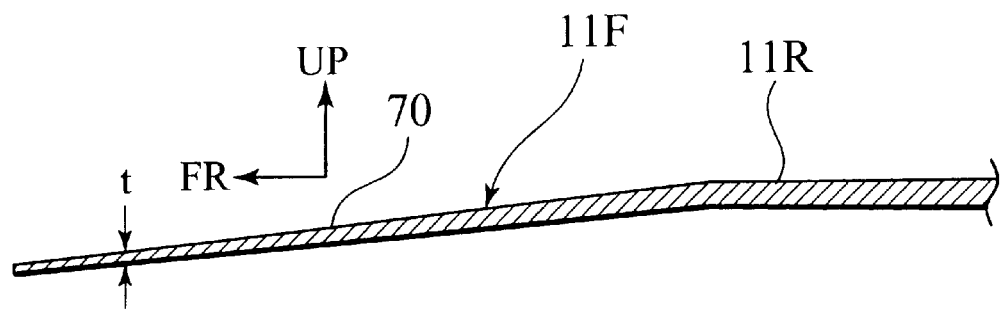
FIG. 15 is an enlarged sectional view taken along a line 15—15 of FIG. 14.
Figure 16:
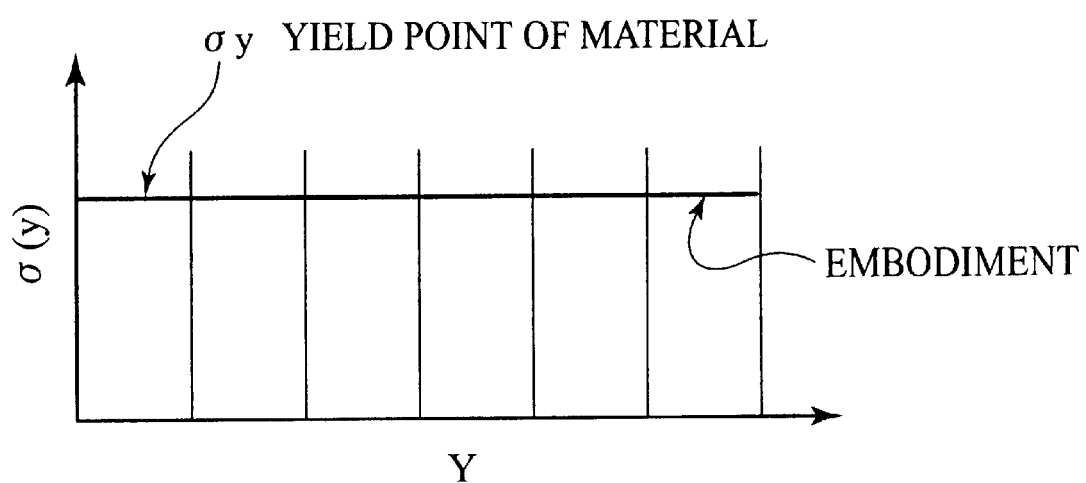
FIG. 16 is a stress-distribution diagram showing the concept of the strength adjusting mechanism of the fourth embodiment of the invention.

FIGS. 14 to 16 show the fourth embodiment of the present invention. Also in this embodiment, elements similar to those of the first embodiment are indicated with the same reference numerals respectively and their overlapping descriptions are eliminated. FIG. 14 is a perspective view of the forward area of the side member of this embodiment. FIG. 15 is an enlarged sectional view taken along a line 15—15 of FIG. 14. FIG. 16 is a stress-distribution diagram showing the concept of the strength adjusting mechanism of the embodiment.

According to the fourth embodiment, the strength adjusting mechanism is formed by a variable sectional-dimension structure 70 where sectional dimensions x, y defining the forward area 11F gradually change in the longitudinal direction of the side member 11, as shown in FIG. 14.

In addition, the variable sectional-dimension structure 70 is formed so that, in the forward area 11F of the side member 11, a plate thickness t tapers off to its front end, as shown in FIG. 15. That is, in the forward area 11F, all of the sectional dimensions x, y and the plate thickness t changes in the longitudinal direction of the side member 11 continuously.

In this embodiment, the side member 11 is formed by an extrusion of light metals, such as aluminum alloy, providing the forward area 11F with the above variables x, y, t.

Also in this embodiment, there is established a condition that, when the collision load F is applied to the front end of the side member 11 statically, the maximum value {see the expression (1)} of the sum of a stress of axial-force component and a stress of moment component both generated in the respective imaginary sections continuing in the longitudinal direction, is constant in the longitudinal direction of the side member 11 and also equal to a yield strength of the extrusion material.

Accordingly, the front body structure of the embodiment can perform the similar functions to those of the first embodiment. That is, since the sectional dimensions of the forward area 11F are changed in the longitudinal direction of the side member 11, it is possible to easily control the maximum stress generated in the imaginary sections when a collision load is applied to the front end of the side member 11. As the side member 11 of this embodiment is also provided with a sort of variable plate-thickness structure, it facilitates the adjustment of balance in strength. Consequently, at the vehicle collision, it is possible to induce a collapse beginning with the front end of the forward area 11F certainly. Additionally, since not only the thickness t but also the sectional dimensions x, y change in the forward area 11F of the side member 11, it is possible to enhance an influence on section modulus by changing the dimensions x, y in comparison with the influence on section modulus by changing the plate thickness t, in view of the strength of materials.

Since the forward area 11F of the side member 11 is formed by an extrusion capable of changing the sectional dimensions x, y and the plate thickness t continuously in the longitudinal direction, the extrusion facilitates the adjustment of plate thickness, thereby promoting the rationalization of the structure and also providing the lightweight structure.

Furthermore, since the sectional dimensions x, y and the plate thickness t change continuously in this embodiment, there can be obtained a stress distribution of substantially constant over the whole sections of the forward area 11F, as shown in FIG. 16.

According to the fourth embodiment, owing to the adoption of an extrusion as the strength adjusting mechanism, it is possible to adjust a distribution of plate thickness or sectional dimensions in the longitudinal direction of the forward area of the side member at will and also possible to control changes of the distribution or the sectional dimensions continuously. Therefore, it is possible to control a change in plate thickness with high accuracy and also possible to adjust the maximum stress generated in the imaginary sections extending in the longitudinal direction of the forward area with high accuracy, thereby promoting the rationalization of the structure and also providing the lightweight structure.

In common with the above-mentioned embodiments, owing to the provision of a variety of strength adjusting mechanisms in the forward area of the side member, it is established that the maximum stress generated in the front part of each one of imaginary sections continuing in the longitudinal direction of the side member becomes more than or close to the maximum stress generated in the rear part of the each one of imaginary sections. Therefore, if the collision load is inputted to the front end of the side member obliquely from the front, the collapse is induced from the front end (input point) of the forward area backward and subsequently, the collapse is continuously transmitted up to the rear part of the forward, whereby the absorbing efficiency of the collision energy can be enhanced.

[5th. Embodiment]

Figure 17:
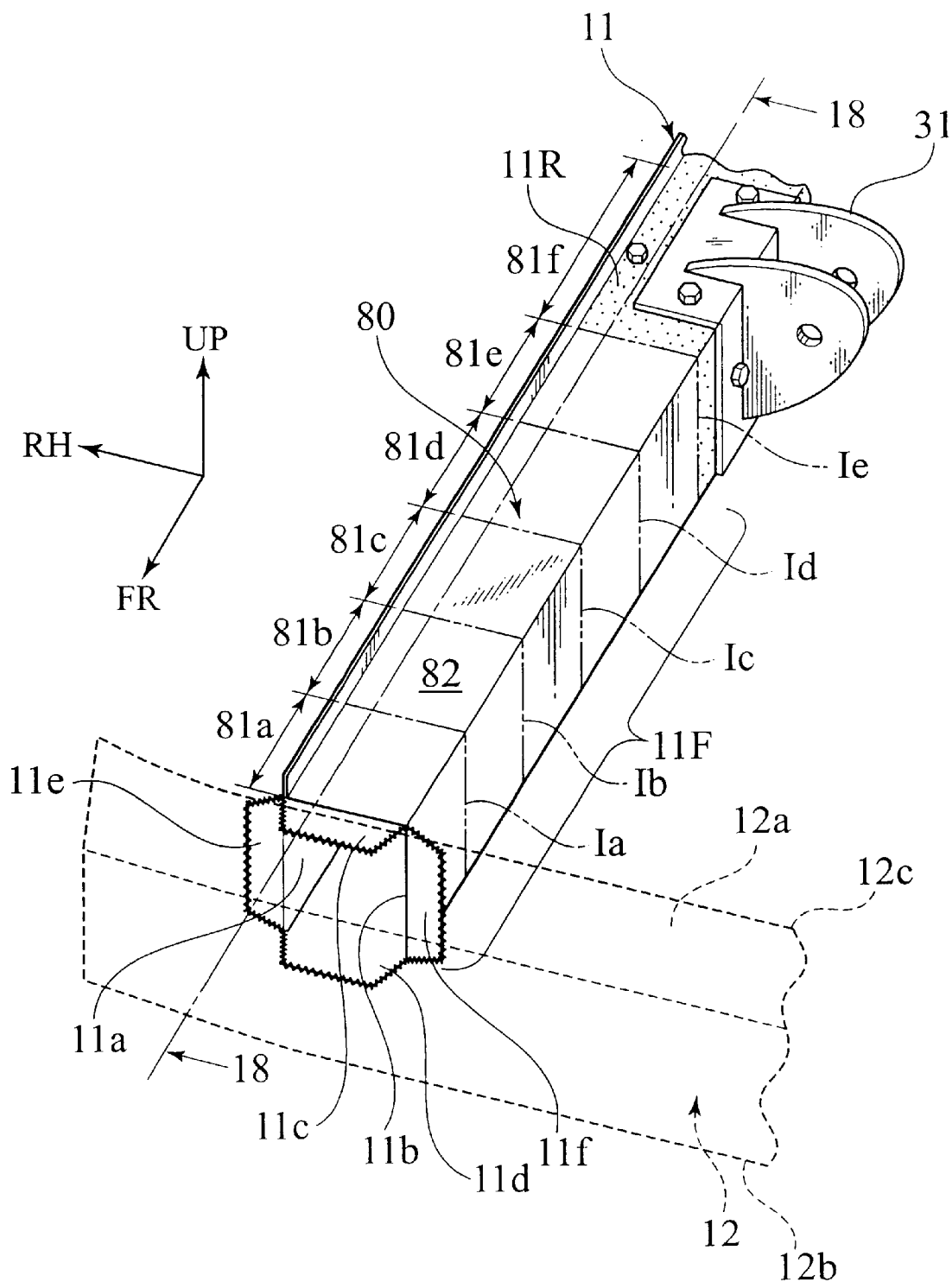
FIG. 17 is a perspective view of the forward area of the side member in accordance with the fifth embodiment of the invention.
Figure 18:
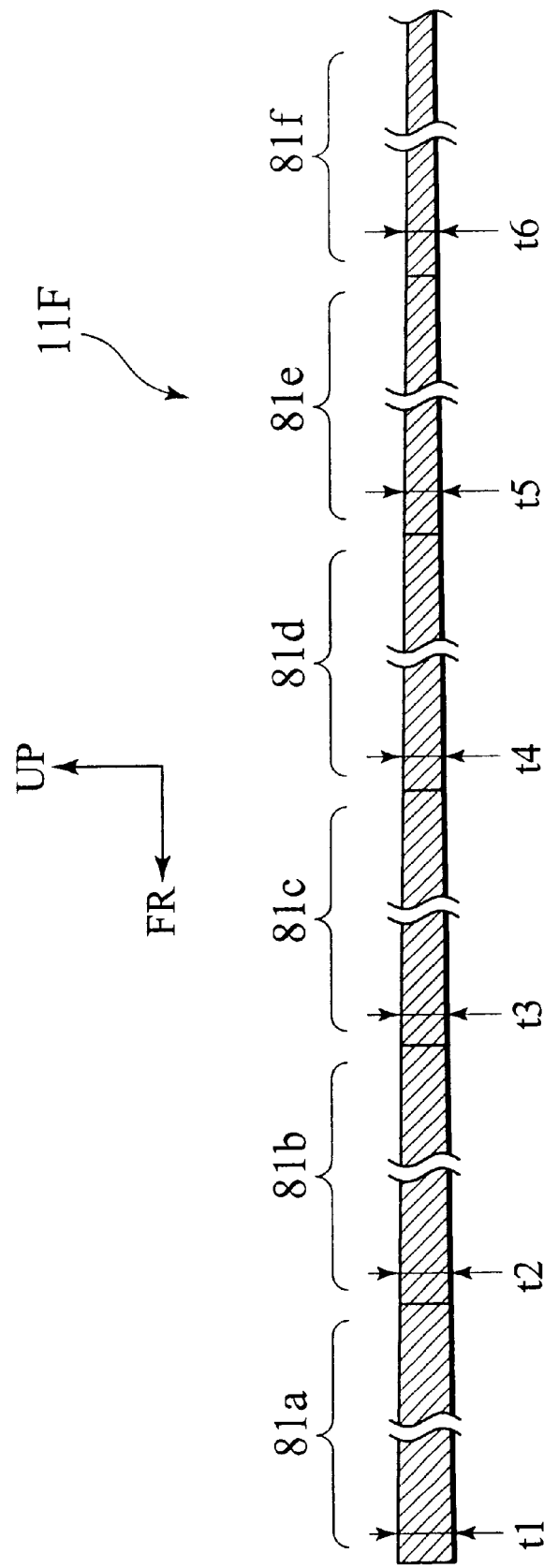
FIG. 18 is an enlarged sectional view taken along a line 18—18 of FIG. 17.

FIGS. 17 to 24 show the fifth embodiment of the present invention. Also in this embodiment, elements similar to those of the first embodiment are indicated with the same reference numerals respectively and their overlapping descriptions are eliminated. FIG. 17 is a perspective view of the forward area of the side member of this embodiment. FIG. 18 is an enlarged sectional view taken along a line 18—18 of FIG. 17.

According to this embodiment, the side member 11 is provided, at its forward area 11F in front of the reinforcement part 11R, with the strength adjusting mechanism by which it is established that the maximum stress generated in the front part of each one of imaginary sections Ia, Ib . . . , Ie extending in the longitudinal direction of the member 11 is less than the maximum stress generated in the rear part of the corresponding section. In detail, the strength adjusting mechanism is embodied by a variable plate-thickness structure 80 which allows the plate thickness of the forward area 11F to be varied in the longitudinal direction of the side member 11.

More in detail, the variable plate-thickness structure 80 is formed by a composite panel member 82. FIG. 18 shows a part of the section of the composite panel member 82. This panel member 82 is produced by welding a plurality of constituent plate members 81a, 81b, 81c, 81d, 81e, 81f (FIG. 18) over the whole peripheries, in succession. In arrangement, the plate member 81a is positioned at the front end of the forward area 11F of the side member 11. Further, respective thicknesses t1, t2, t3, t4, t5, t6 of the members 81a, 81b, 81c, 81d, 81e, 81f are established so as to gradually change in accordance with the following relationship of:

$$t1 > t2 > t3 > t4 > t5 > t6$$

Figure 2:
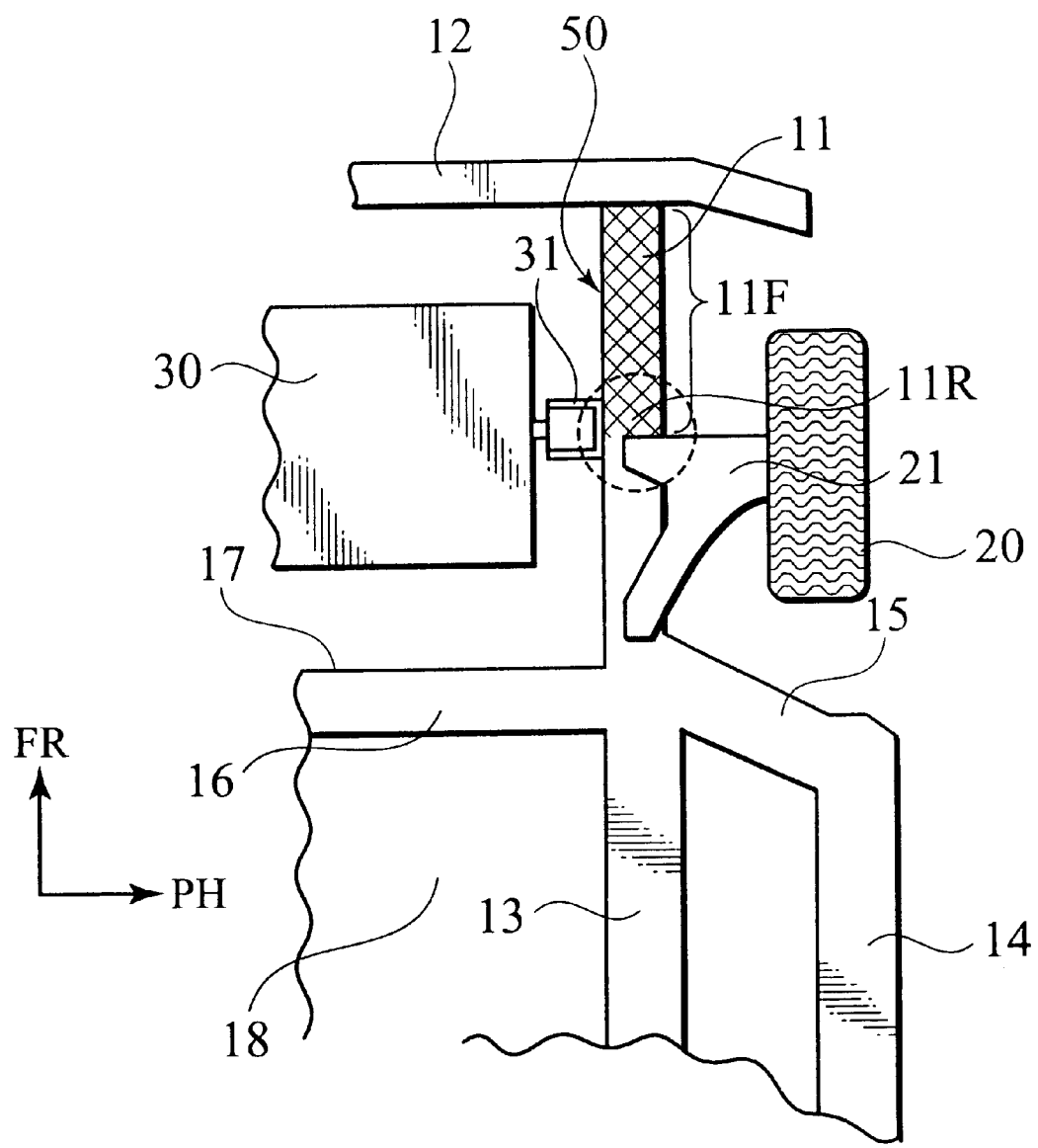
FIG. 2 is a schematic plan view showing a right-and-front framework of the front body structure in accordance with the first embodiment of the invention.

Therefore, the plate member 51f having the smallest thickness corresponds to the reinforcement part 11R. Nevertheless, the reinforcement part 11R has enough strength to support the power unit 30 (FIG. 2).

Figure 19:
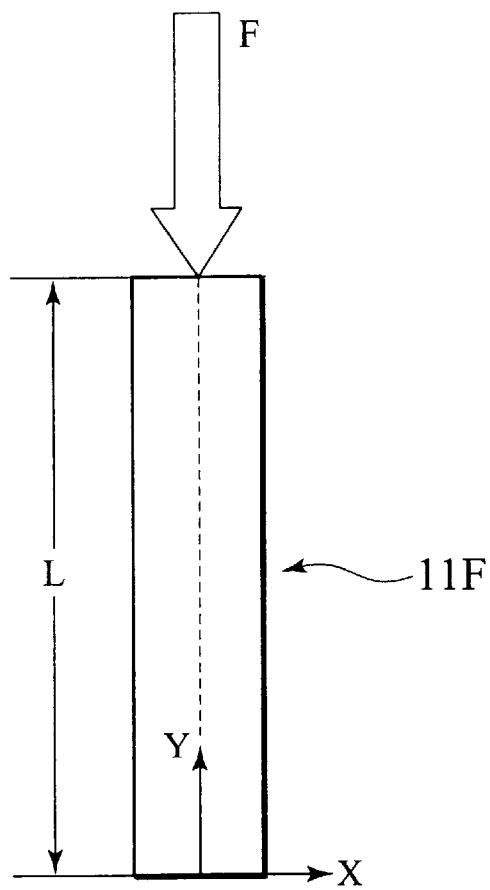
FIG. 19 is a view showing an input model of a collision load on the strength adjusting mechanism of the fifth embodiment of the invention.
Figure 20:
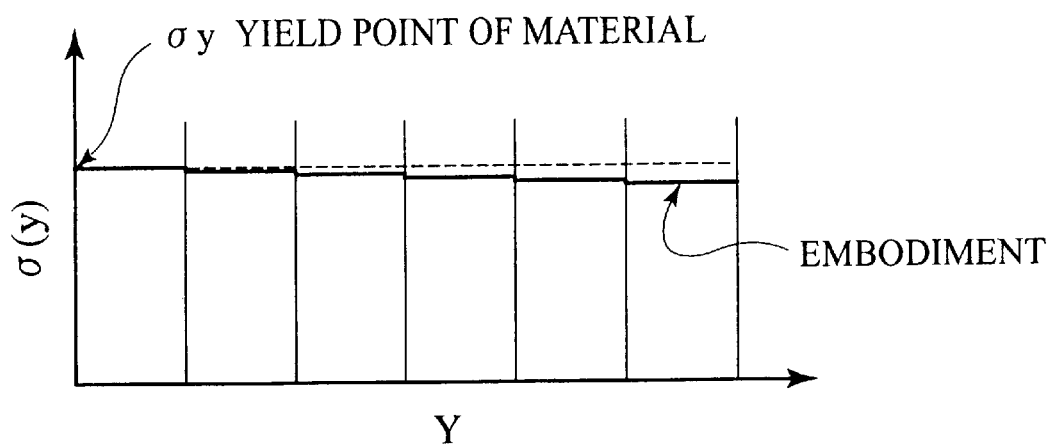
FIG. 20 is a stress-distribution diagram showing the concept of the strength adjusting mechanism in accordance with the fifth embodiment of the invention.
Figure 21:
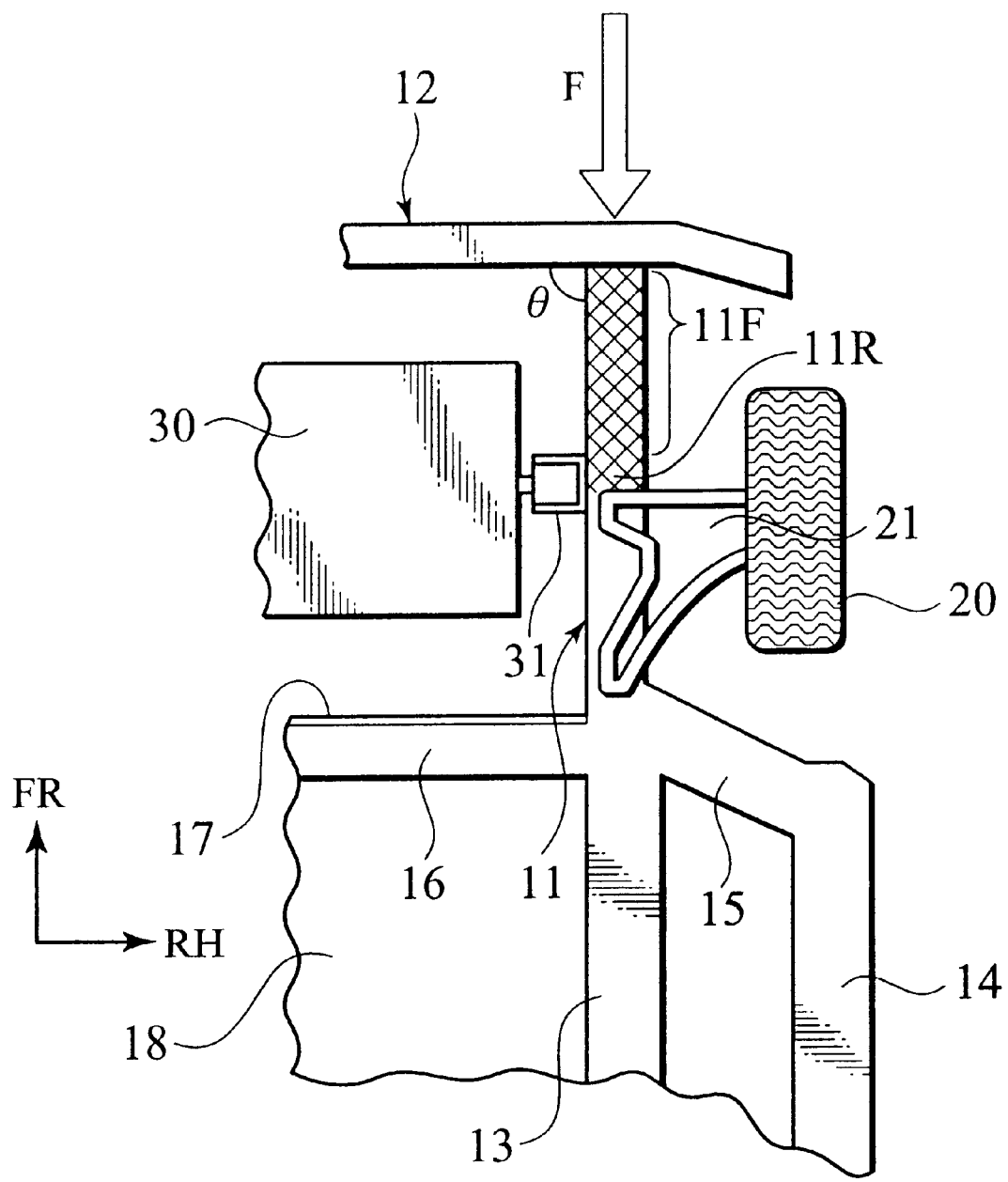
FIG. 21 is a schematic plan view of the front body part showing a front collision input form of the front body structure in accordance with the fifth embodiment of the invention.

Additionally, the forward area 11F of the side member 11 is defined in the following relationship. As shown in FIG. 19, when a collision load F is statically exerted to the front end of the forward area 11F from the front, the upper limit of the maximum stress in accordance with the variable plate-thickness structure 80 is established on the basis of the yield strength of the material forming the side member 11, as mentioned above. As a result, there can be obtained a distribution of the yield strength $\sigma(y)$ with respect to the plate members 81a, 81b, 81c, 81d, 81e, 81f, as shown in FIG. 20.

In this embodiment, as shown in FIG. 17, the side member 11 is provided, on its front end, with four flange parts 11c, 11d, 11f, 11e. In order to enhance the connecting strength between the bumper reinforcement 12 and the side member 11, the flange parts 11c, 11d are welded to an upper face 12a of the bumper reinforcement 12 and the lower face 12b, respectively. Similarly, the flange parts 11e, 11f of the side member 11 are welded to the rear face 12c of the bumper reinforcement 12.

Now, when "Z" represents a section modulus of the second moment of area of the closed-sectional bumper reinforcement 12 with respect to the vertical axis of the vehicle, "Fmax" a maximum reaction force when the front part of the side member 11 collapses, "L" a span of the forward area 11F and "σy–bmpr" represents a yield stress of constituent materials of the bumper reinforcement 12, there is established the following relationship (2):

$$Z > F\text{max} \times L / (\sigma y - \text{bmpr}) \tag{2}$$

That is, it is established that the section modulus "Z" becomes more than the product of the maximum reaction force (at collapse) "Fmax" multiplied by the quotient that the span "L" divided by the yield stress "σy–bmpr" makes.

Simultaneously, when "Sjoint" represents a strength of a joint part of the bumper reinforcement 12, there is established the following relationship (3):

$$Sjoint > L \times Fmax \quad (3)$$

That is, it is established that the strength "Sjoint" becomes more than the product of the maximum reaction force (at collapse) "Fmax" multiplied by the span "L".

(Effect)

Figure 22:
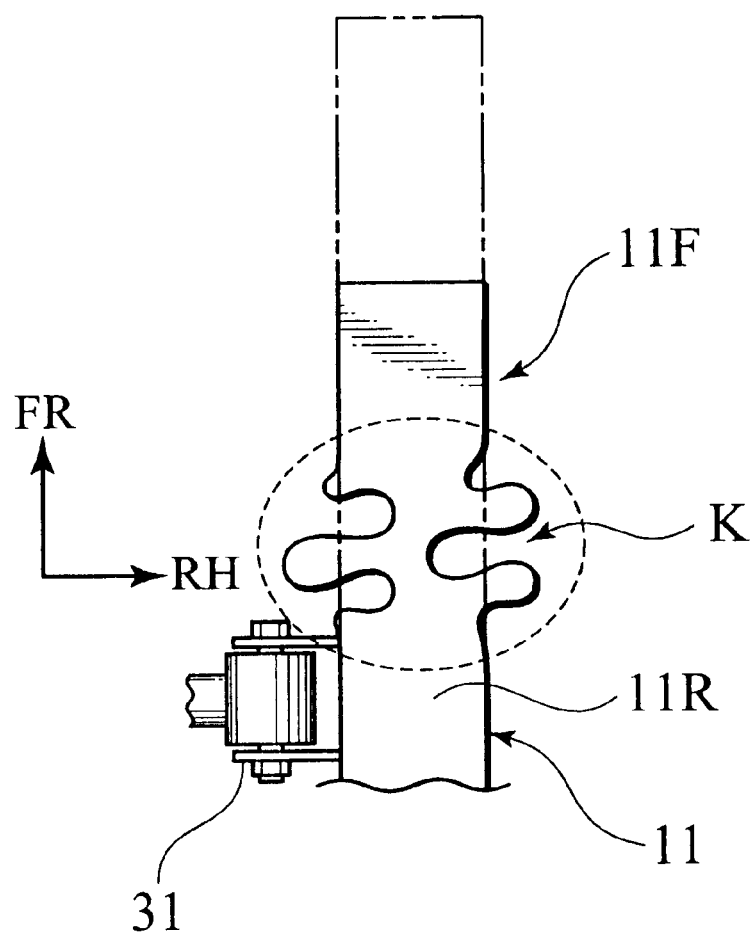
FIG. 22 is a view explaining a deformation mode of the side member in accordance with the fifth embodiment of the invention.

According to the front body structure of the fifth embodiment, if a collision load F is exerted on the front end of the side member 11 from the front (see FIG. 21), a collapse K is firstly produced in the rear part of the forward area 11F, as shown in FIG. 22. Then, the collapse K is continuously induced toward the front part of the side member 11. As a result, the collapse K is transmitted to the front end of the forward area 11F, whereby the absorbing efficiency of the collision energy can be enhanced.

In this way, since the collapse K of the side member 11 is induced from the rear part of the forward area 11F as the starting point of collapse, the rigidity of the front end of the side member 11 is maintained high, so that an angle θ between the bumper reinforcement 12 and the side member 11 is maintained to be constant.

Figure 23:
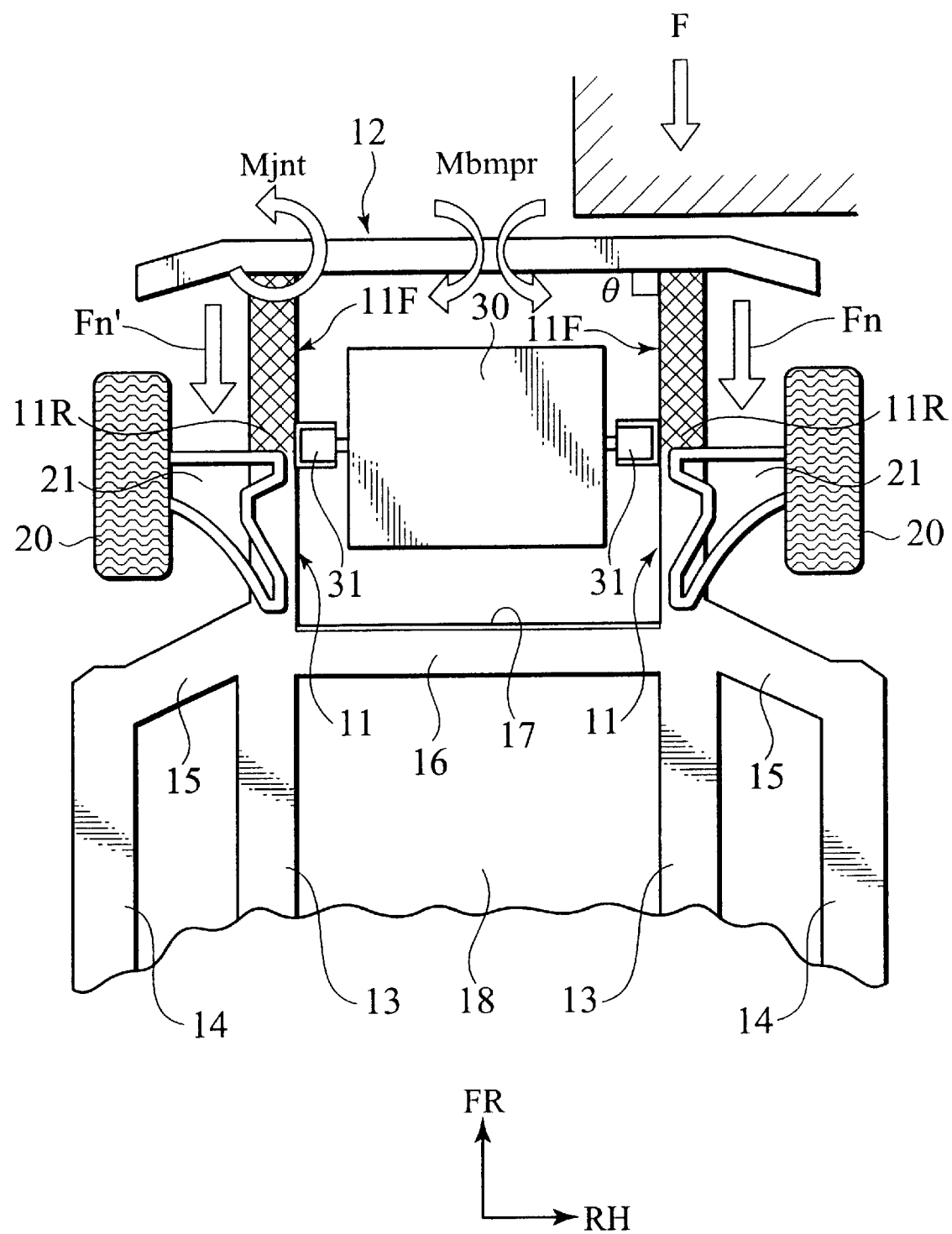
FIG. 23 is a schematic plan view of the front body part showing the load-dispersion form of the front body structure in accordance with the fifth embodiment of the invention, at the offset collision.

Accordingly, as shown in FIG. 23, when the collision load F is exerted to one side of the vehicle at its "offset" collision, an axial input Fn acts on the side member 11 on the collision side (right), thereby generating opposing moments Mbmpr in the bumper reinforcement 12 and also a moment Mjnt about the connecting part between the bumper reinforcement 12 and the side member 12 on the non-collision side (left).

Thus, the bumper reinforcement 12 moves backward while maintaining its posture in parallel with the width direction of the vehicle. Consequently, an axial input Fn' is exerted to the side member 11 on the non-collision side (left), thereby accomplishing the load dispersion of the collision effectively.

Figure 24:
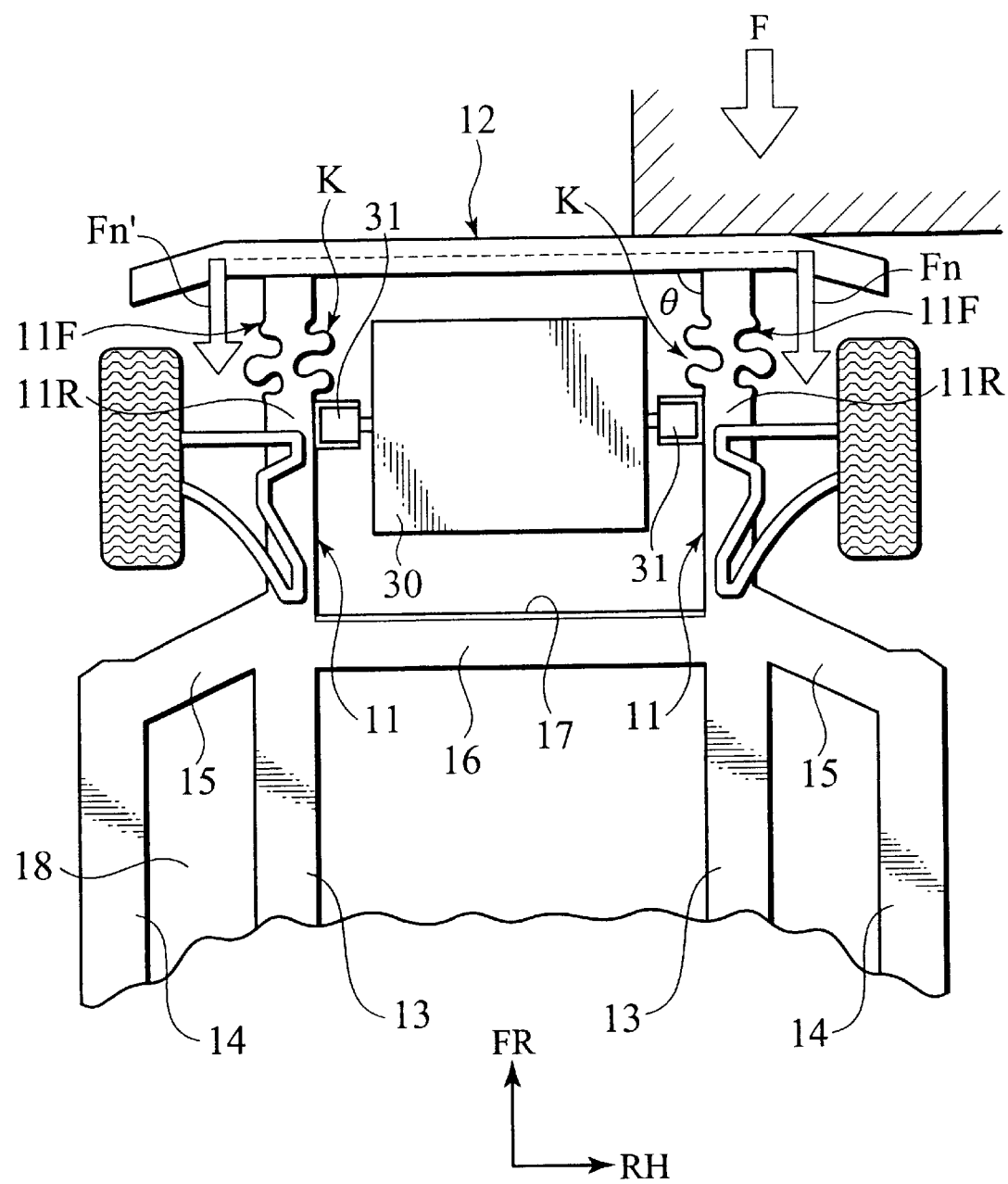
FIG. 24 is a schematic plan view of the front body part showing the deformation mode of the side members at the offset collision, in accordance with the fifth embodiment of the invention.

Hereat, since there are established the above relationships (2), (3) in the variable plate-thickness structure 80 of this embodiment, as shown in FIG. 24, the rigidity of the bumper reinforcement 12 itself can be highly maintained to avoid its fracture and further, the joint strength between the bumper reinforcement 12 and the side member 11 can be ensured enough to maintain the constant angle θ.

Accordingly, since the axial input Fn allows the collapse K to be caused from the rear part of the forward area 11F on the collision side and the axial input Fn' allows the collapse K to be caused from the rear part of the forward area 11F on the non-collision side, it is possible to enhance the absorption efficiency of the collision energy even if the vehicle has the offset collision.

Particularly, since the forward areas 11F opposing in the width direction of the vehicle are respectively formed to extend straightly in the fore-and-aft direction of the vehicle and are paralleled each other, each angle θ becomes a right angle. Accordingly, not to mention a "full-rap" collision, even when the vehicle has the offset collision, the continuous collapse can be effectively produced from the rear part of each forward area 11F, improving the energy-absorption characteristics of the vehicle.

Again in the variable plate-thickness structure 80, the upper limit of the maximum stress is established on the basis of the yield strength of the material forming the side member 11. Thus, when the collision load is applied to the front end of the side member 11, the rear part of the forward area 11F having an increased maximum stress firstly reaches the yielding area of the material to produce a plastic deformation. Consequently, at the vehicle collision, it is possible to induce the forward areas' collapse beginning at the rear parts more certainly.

Furthermore, since the variable plate-thickness structure 80 is provided by changing the distribution of plate-thickness of the forward area 11F in the longitudinal direction of the side member 11, it is possible to easily control the maximum stress generated in the imaginary sections Ia, Ib, . . . , Ie when the collision load F is applied to the front end of the side member 11. Thus, the variable plate-thickness structure 80 facilitates the adjustment of balance in strength, inducing the collapse K of the forward area 11F beginning at its rear end at the collision more certainly.

According to the embodiment, since the variable plate-thickness structure 80 is formed by the composite panel member 82 which is obtained by welding the plural plate members 81a, 81b, 81c, 81d, 81e, 81f having different thicknesses t1, t2, t3, t4, t5, t6 in a manner that the thicknesses gradually change, it is possible to control the maximum stress generated in the imaginary sections Ia, Ib, . . . , Ie extending in the longitudinal direction of the side member 11 approximately, whereby the collapse K beginning at the front end of the forward area 11F can be induced with no hindrance. Again, since the composite panel member 82 can be simply obtained by welding the plural plate members 81a, 81b, 81c, 81d, 81e, 81f having different thicknesses t1, t2, t3, t4, t5, t6 and it is possible to form the forward area 11F with ease.

As to the number of plate members 81a, . . . , 81f, it is not limited to the number of this embodiment only. The number may be determined in accordance with the required collapse characteristics of the forward area 11F.

[6th. Embodiment]

Figure 25:
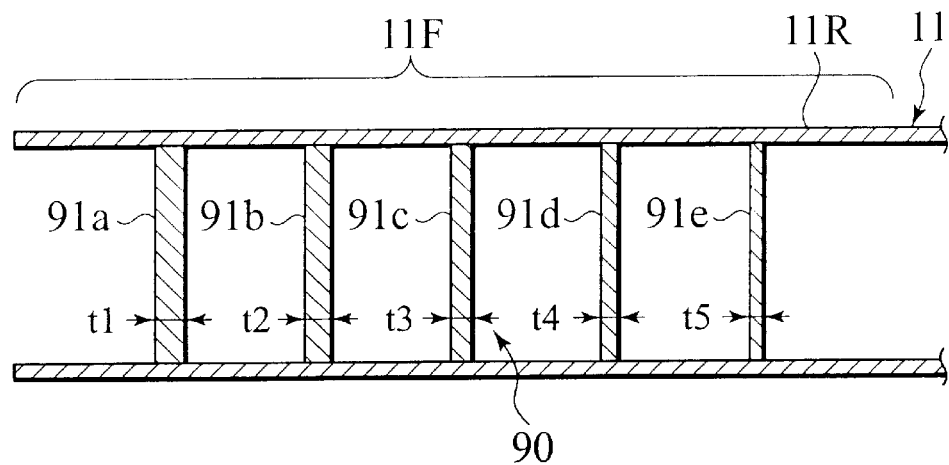
FIG. 25 is an enlarged sectional view of the forward area of the side member in accordance with the sixth embodiment of the invention.

FIG. 25 shows the sixth embodiment of the invention. In the sixth embodiment, elements similar to those of the first embodiment are indicated with the same reference numerals respectively and their overlapping descriptions are eliminated. FIG. 25 is an enlarged sectional view of the forward area of the side member.

In this embodiment, the strength adjusting mechanism of the invention is formed by a variable partition-thickness structure 90 of FIG. 25. In the variable partition-thickness structure 90, a plurality of partitions 91a, 91b, 91c, 91d, 91e are arranged in the closed section of the forward area 11F of the side member 11, at appropriate intervals in the longitudinal direction. Additionally, respective thicknesses t1, t2, t3, t4, t5 of the partitions 91a, 91b, 91c, 91d, 91e are established so as to gradually change in the longitudinal direction of the side member 11 with the following relationship of:

$$t1 > t2 > t3 > t4 > t5$$

The partitions 91a, 91b, 91c, 91d, 91e are secured with the inside wall of the side member 11 at the forward area 11F, into one body. Owing to the interposition of the partitions 91a, 91b, 91c, 91d, 91e in the side member 11, the rigidity of the side member 11 can be enhanced at the forward area 11F. Further, corresponding to the plate thicknesses t1, t2, t3, t4, t5 of the partitions 91a, 91b, 91c, 91d, 91e, the increasing rate in rigidity is gradually increased as approaching forward.

Then, the rigidity of the reinforcement part 11R mounting the power unit 30 (see FIG. 2) thereon can be ensured by the plate thickness t5 of the partition 91e. In the sixth embodiment, a plate thickness t of the circumferential wall of the side member 11 is established to be constant over the whole sections of the forward area 11F.

Therefore, according to the sixth embodiment of the invention, the maximum stress generated in the imaginary sections succeeding in the longitudinal direction of the forward area 11F when the collision load F is applied to the front end of the side member 11, can be controlled by the formation of the partitions 91a, 91b, 91c, 91d, 91e. Thus, the variable partition-thickness structure 90 facilitates the adjustment of balance in strength, whereby the collapse K at the collision can be induced from the front end of the forward area 11F certainly, effecting the similar effects to the first embodiment.

Although the plate thickness t of the circumferential wall of the side member 11 is constant over the whole sections of the forward area 11F, the variable partition-thickness structure 90 of this embodiment may be combined with the afore-mentioned variable plate-thickness structure 80 of the fifth embodiment, providing the strength adjusting mechanism in one modification.

[7th. Embodiment]

Figure 26:
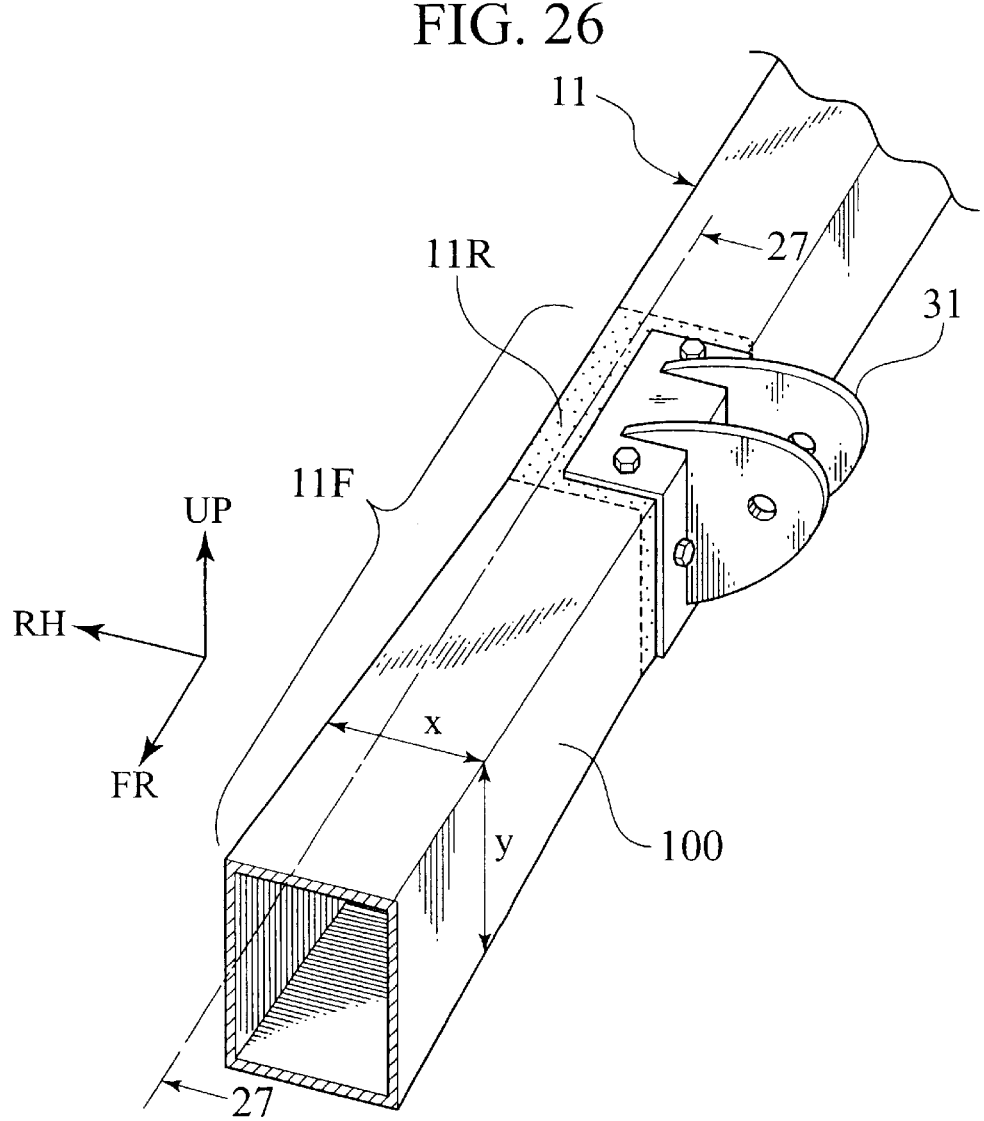
FIG. 26 is a perspective view of the forward area of the side member in accordance with the seventh embodiment of the invention.
Figure 27:
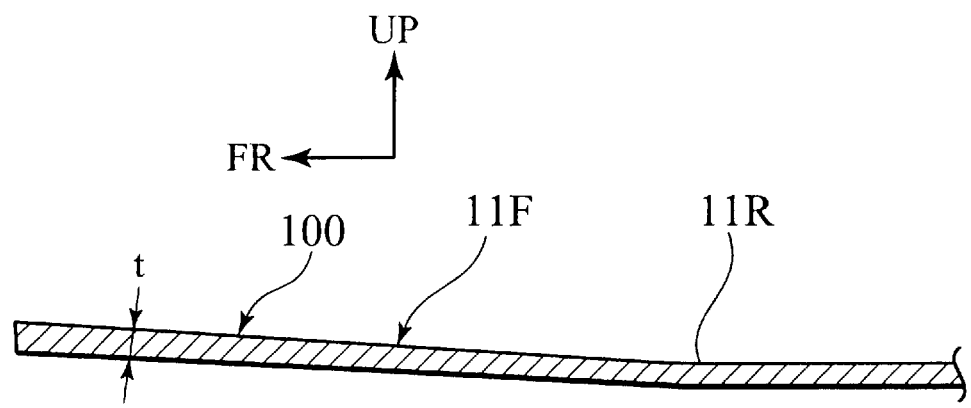
FIG. 27 is an enlarged sectional view taken along a line 27—27 of FIG. 26.
Figure 28:
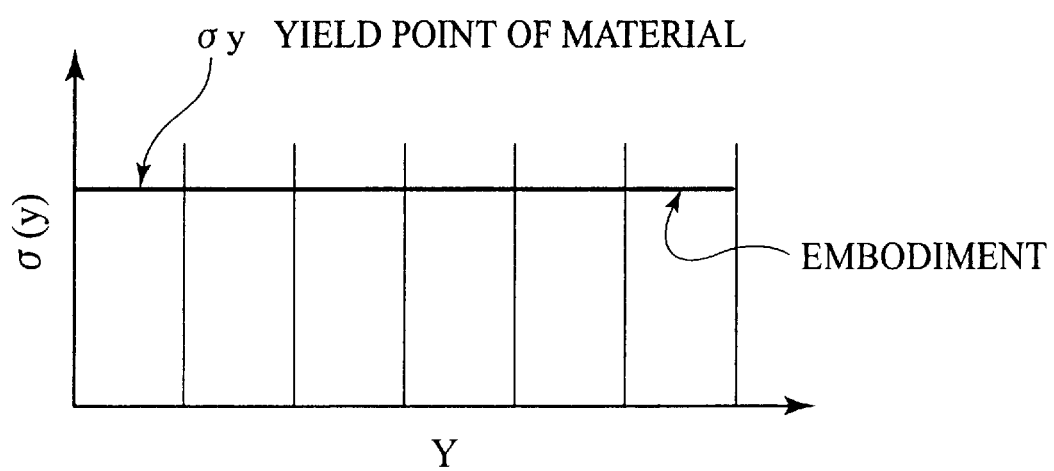
FIG. 28 is a stress-distribution diagram showing the concept of the strength adjusting mechanism in accordance with the seventh embodiment of the invention.

FIGS. 26 to 28 show the seventh embodiment of the present invention. Also in this embodiment, elements similar to those of the first embodiment are indicated with the same reference numerals respectively and their overlapping descriptions are eliminated. FIG. 26 is a perspective view of the forward area of the side member of this embodiment. FIG. 27 is an enlarged sectional view taken along a line 27—27 of FIG. 26. FIG. 28 is a stress-distribution diagram showing the concept of the strength adjusting mechanism of the embodiment.

According to the seventh embodiment, as shown in FIG. 26, the strength adjusting mechanism is formed by a variable sectional-dimension structure 100 where sectional dimensions x, y defining the forward area 11F gradually increase in the longitudinal direction of the side member 11 as approaching the front end of the side member 11.

In addition, the variable sectional-dimension structure 100 is formed so that, in the forward area 11F of the side member 11, a plate thickness t increases as approaching the front end of the member 11, as shown in FIG. 27. That is, in the forward area 11F, all of the sectional dimensions x, y and the plate thickness t changes in the longitudinal direction of the side member 11 continuously.

In this embodiment, the side member 11 is formed by an extrusion of light metals, such as aluminum alloy.

Accordingly, the front body structure of the embodiment can perform the similar functions to those of the fifth embodiment. That is, since the sectional dimensions of the forward area 11F are changed in the longitudinal direction of the side member 11, it is possible to easily control the maximum stress generated in the imaginary sections when a collision load is applied to the front end of the side member 11. As the side member 11 of this embodiment is also provided with a sort of variable plate-thickness structure, it facilitates the adjustment of balance in strength. Consequently, at the vehicle collision, it is possible to induce a collapse beginning with the front end of the forward area 11F certainly. Additionally, since not only the thickness t but also the sectional dimensions x, y change in the forward area 11F of the side member 11, it is possible to enhance an influence on section modulus by changing the dimensions x, y in comparison with the influence on section modulus by changing the plate thickness t, in view of the strength of materials.

Since the forward area 11F of the side member 11 is formed by an extrusion capable of changing the sectional dimensions x, y and the plate thickness t continuously in the longitudinal direction, the extrusion facilitates the adjustment of plate thickness, thereby promoting the rationalization of the structure and also providing the lightweight structure.

Furthermore, since the sectional dimensions x, y and the plate thickness t change continuously in this embodiment, there can be obtained a stress distribution of substantially constant over the whole sections of the forward area 11F, as shown in FIG. 28.

According to the seventh embodiment, owing to the adoption of an extrusion as the strength adjusting mechanism, it is possible to adjust a distribution of plate thickness or sectional dimensions in the longitudinal direction of the forward area of the side member at will and also possible to control changes of the distribution or the sectional dimensions continuously. Therefore, it is possible to control a change in plate thickness with high accuracy and also possible to adjust the maximum stress generated in the imaginary sections extending in the longitudinal direction of the forward area with high accuracy, thereby promoting the rationalization of the structure and also providing the lightweight structure.

[8th, Embodiment]

Figure 29:
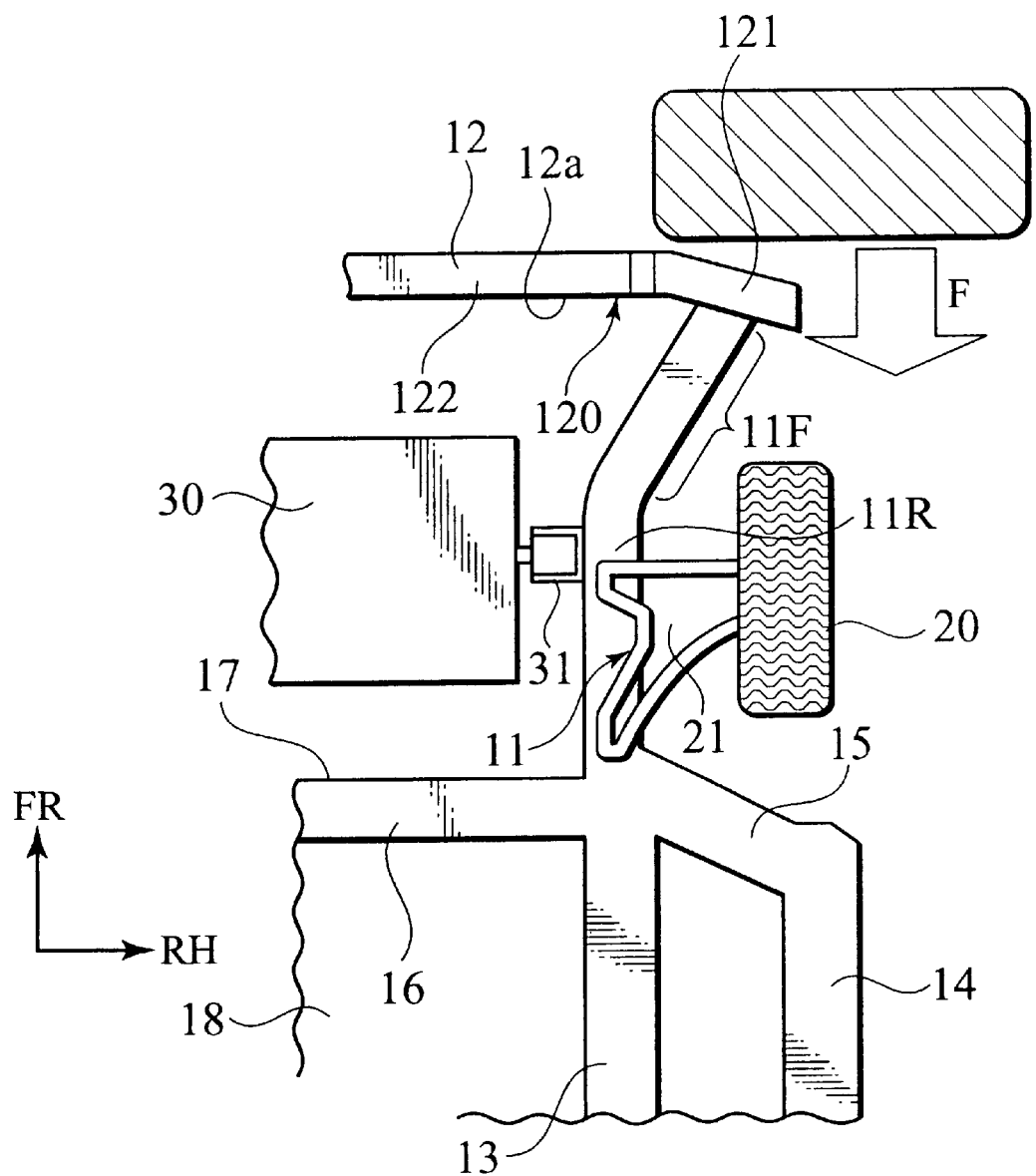
FIG. 29 is a schematic plan view showing a right-and-front framework of the front body structure in accordance with the eighth embodiment of the invention.

FIGS. 29 to 38 show the eighth embodiment of the front body structure in accordance with the present invention. Also in this embodiment, elements similar to those of the first embodiment are indicated with the same reference numerals respectively and their overlapping descriptions are eliminated. FIG. 29 is a plan view of the front body structure.

Figure 30:
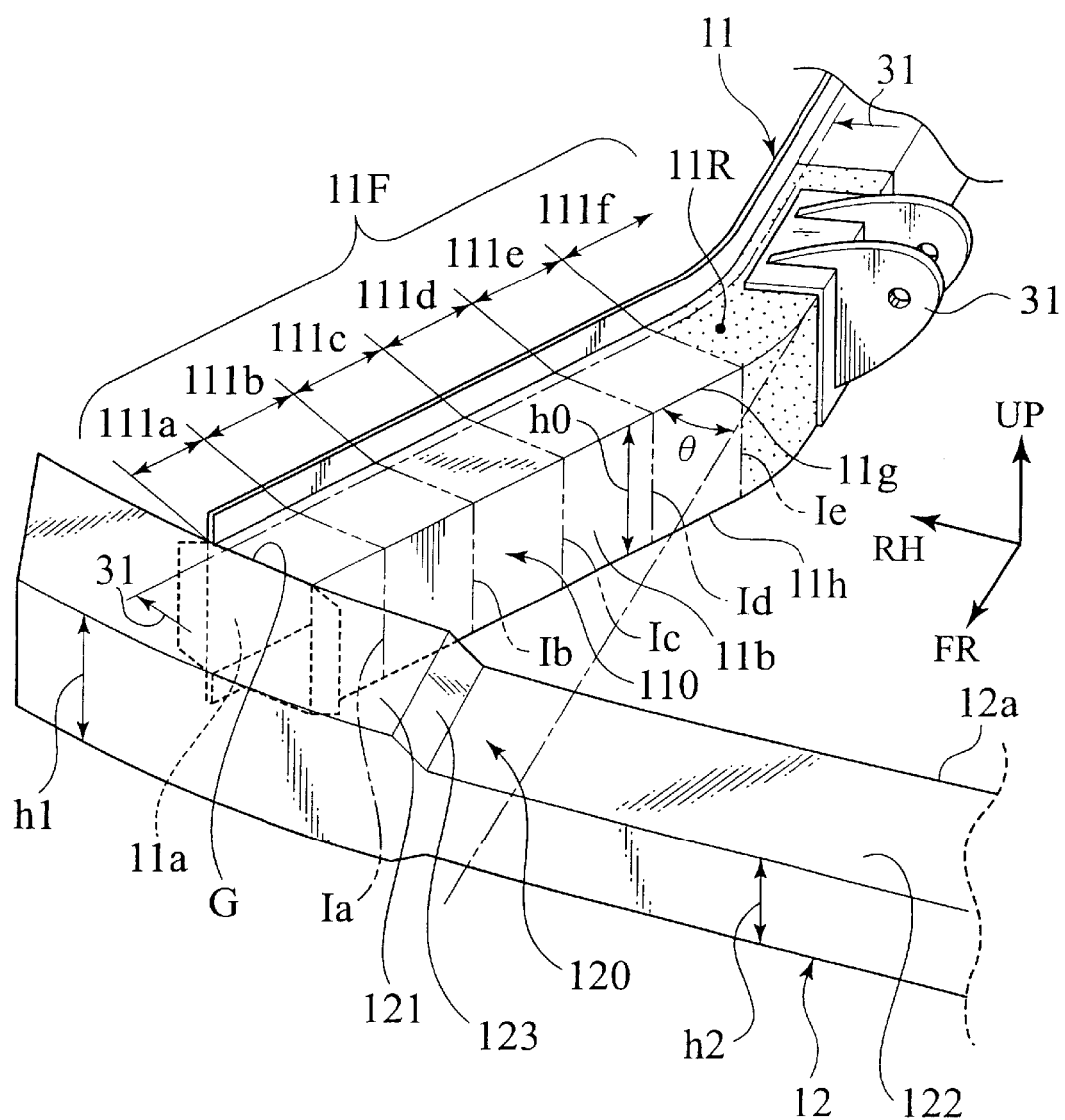
FIG. 30 is a perspective view of the forward area of a side member in accordance with the eighth embodiment of the invention.

As shown in FIGS. 29 and 30 representatively, according to the embodiment, the forward area 11F in front of the reinforcement part 11R of the side member 11 is inclined outward in the width direction of the vehicle by a predetermined angle θ as approaching the front end of the side member 11.

Similarly to the first embodiment, the forward area 11F of the side member 11 is provided with a variable plate-thickness structure 110 (as the strength adjusting mechanism) by which it is established that the maximum stress generated in the front part of each one of imaginary sections Ia, Ib, . . . , Ie extending in the longitudinal direction of the member 11 is larger than or close to the maximum stress generated in the rear part of the corresponding section. In the variable plate-thickness structure 110, the plate thickness of the forward area 11F is changed in the longitudinal direction of the side member 11.

Figure 31:
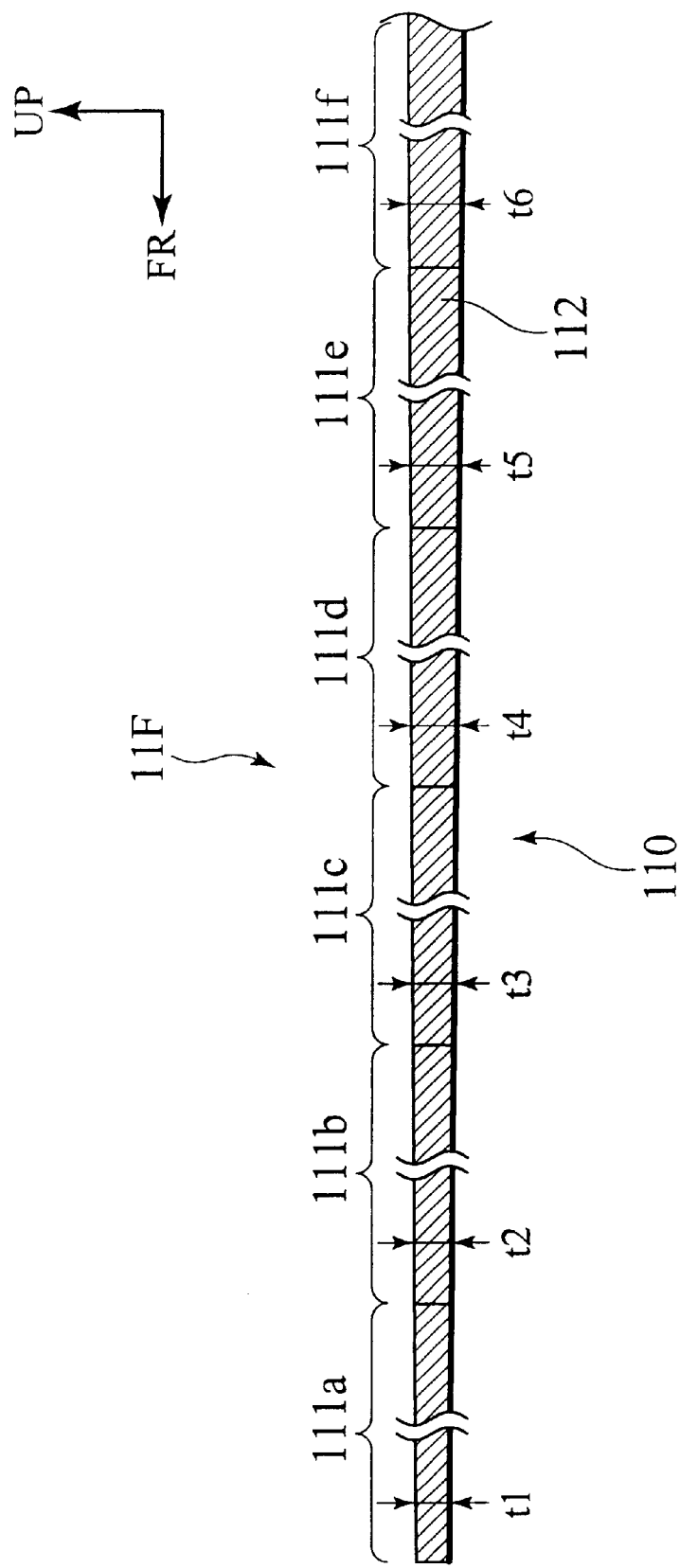
FIG. 31 is an enlarged sectional view taken along a line 31—31 of FIG. 30.

In detail, the variable plate-thickness structure 110 is formed by a composite panel member 112. FIG. 31 shows a part of the section of the composite panel member 112. This panel member 112 is produced by welding a plurality of constituent plate members 111a, 111b, 111c, 111d, 111e, 111f (FIG. 31) over the whole peripheries, in succession. In arrangement, the plate member 111a is positioned at the front end of the forward area 11F of the side member 11. Further, respective thicknesses t1, t2, t3, t4, t5, t6 of the members 111a, 111b, 111c, 111d, 111e, 111f are established so as to gradually change in accordance with the following relationship of:

$$t1 < t2 < t3 < t4 < t5 < t6$$

Therefore, the plate member 111f having the largest thickness corresponds to the reinforcement part 11R.

Figure 32A:
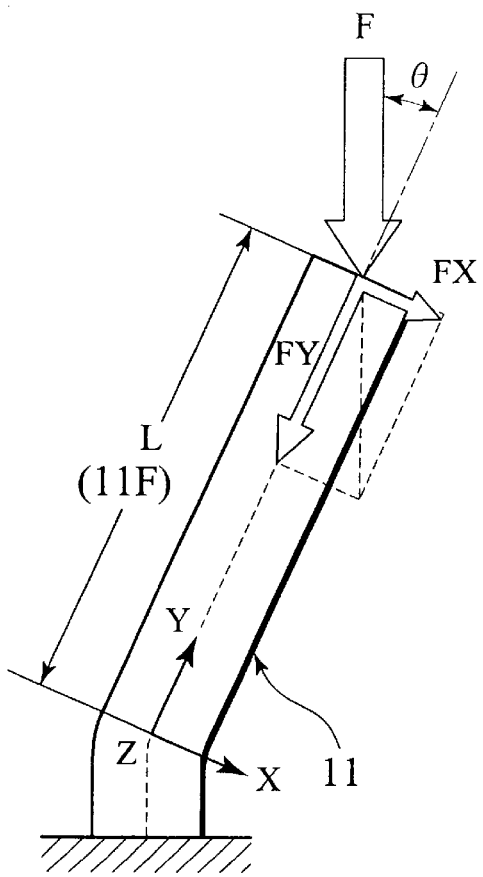
Figure 32B:
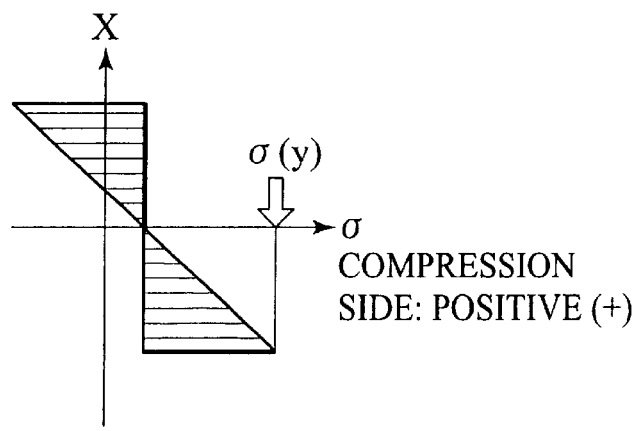

Additionally, the forward area 11F of the side member 11 is defined in the following relationship. As shown in FIGS. 32A and 32B, when a collision load F is statically exerted to the front end of the forward area 11F from the front, there is established, as to the maximum value of the sum of a stress of axial-force component (FY/A(y)) and a stress of moment component ({FX×(L−y)}/Z(y)) both generated in the respective imaginary sections Ia, Ib, . . . , Ie (see FIG. 30), a relationship that the maximum value of front part of each imaginary section is nearly equal to that of the rear part of the same imaginary section (front part≈rear part). Furthermore, it is established that respective upper limits of the maximum values each coincides with a yield strength σ(y) of the constituent material of the side member 11, as shown by the following expression (4).

$$\sigma(y)=\{FY/A(y)\}+\{FX\times(L-y)\}/Z(y) \qquad (4)$$

Figure 33:
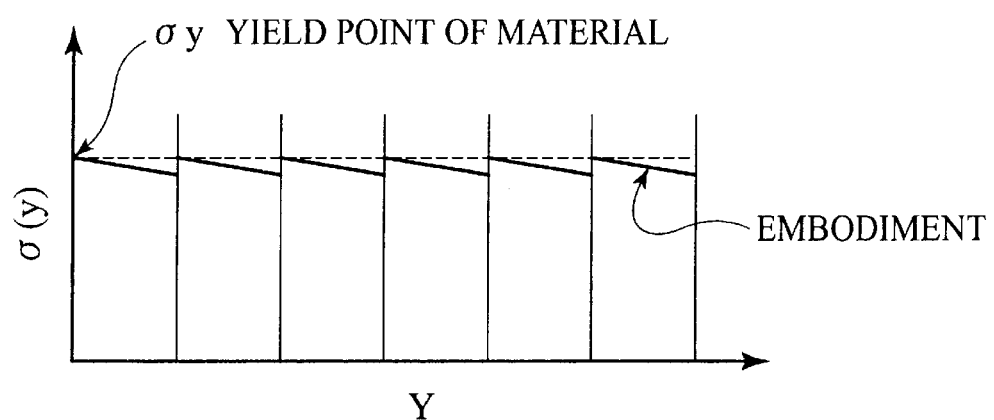
FIG. 33 is a stress-distribution diagram showing the concept of the strength adjusting mechanism in accordance with the eighth embodiment of the invention.

Then, the upper limit of the maximum stress in accordance with the variable plate-thickness structure 110 is established on the basis of the yield strength of the material forming the side member 11, as mentioned above. As a result, there can be obtained a distribution of the yield strength σ(y) with respect to the plate members 111a, 111b, 111c, 111d, 111e, 111f, as shown in FIG. 33.

Figure 34A:
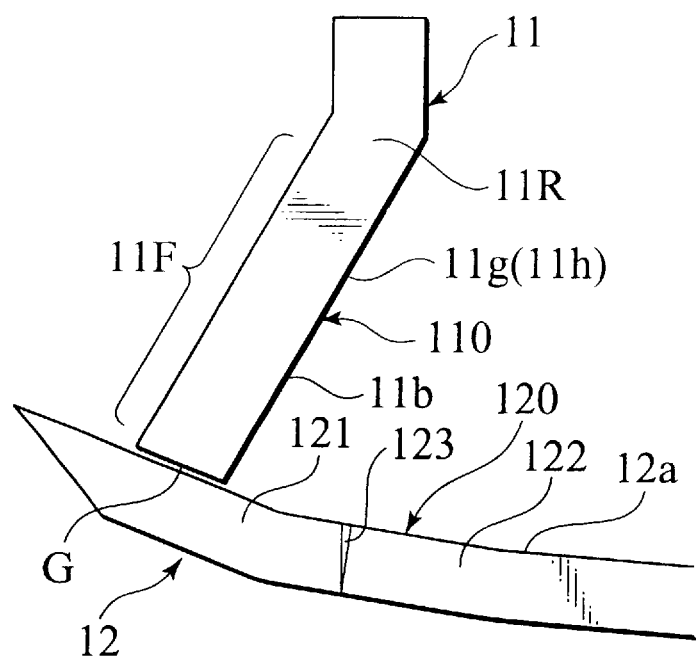
FIGS. 34A to 34C are sequential views showing the deformation mode of the forward area of the side member by the reaction force adjusting mechanism of the eighth embodiment of the invention.
Figure 34B:
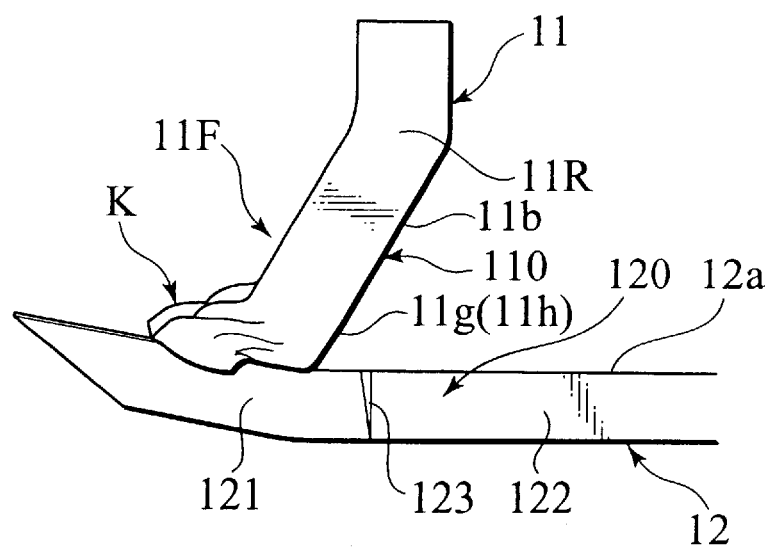
Figure 34C:
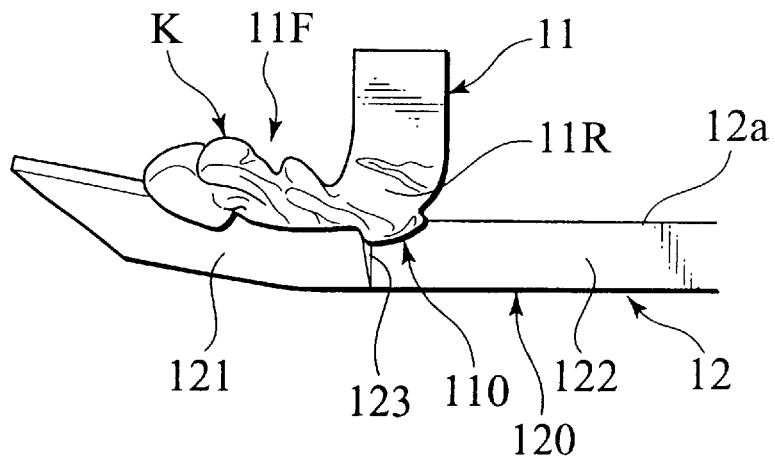

The forward area 11F of the embodiment is inclined outward in the width direction of the vehicle. Therefore, if the collision load F is exerted to the forward area 11F from the front, then the side member 11 is collapsed from the front successively, as shown in FIGS. 34A, 34B and 34C. With the progress of collapse K, the so-deformed side member 11 interferes with the rear face of the bumper reinforcement 12. According to the embodiment, the bumper reinforcement 12 is provided with a reaction force adjusting mechanism that operates to restrict an increase of a reaction force of the side member 11 when the interference of the side member 11 with the bumper reinforcement 12 advances to a certain extent. The reaction force adjusting mechanism includes a changed height part 120 of the bumper reinforcement 12. As shown in FIG. 30, the changed height part 120 has an increased-height area 121 formed in the vicinity of a connecting part G of the side member 11 with the bumper reinforcement 12. The increased-height area 121 has a height "h1" substantially equal to or more than a height "h0" of a section of the side member 11. Additionally, the changed height part 120 has a reduced-height area 122 arranged inward and apart from the connecting part G by a predetermined distance. The reduced-height area 122 has a height "h2" less than the height "ho" of the section of the side member 11. Corresponding to a side face 11b of the forward area 11F of the side member 11 except its upper and lower ridgelines 11g, 11h, the reduced-height area 122 is defined so as to obliquely confront the side face 11b.

For example, the changed height part 120 defined on the bumper reinforcement 12 may be formed by using a press-forming machine (not shown) utilizing the action of liquid pressure. In this case, the above reduced-height area 122 is provided by partially depressing both upper face and lower face of the bumper reinforcement 12 having a closed section. Consequently, the increased-height area 121 and the reduced-height area 122 are successively formed on the bumper reinforcement 12, through a step part 123 as the boundary.

Figure 36A:
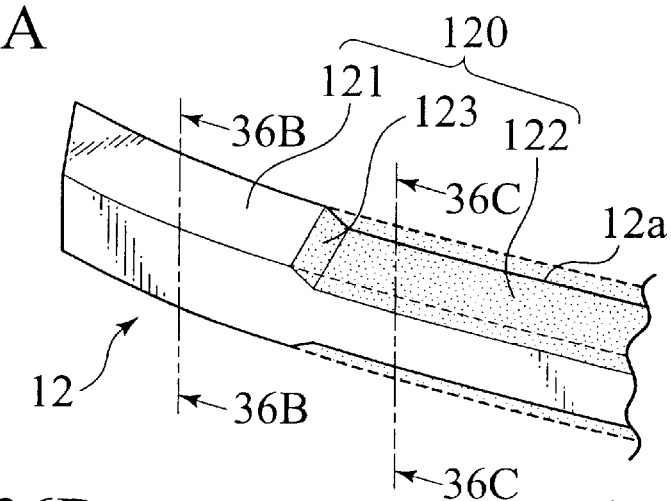
FIG. 36A is a perspective view explaining another example of the technique of forming the bumper reinforcement forming the reaction force adjusting mechanism of the eighth embodiment of the invention.
Figure 36B:
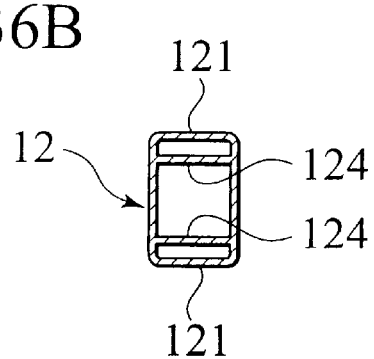
FIG. 36B is a sectional view taken along a line 36B—36B of FIG. 36A.
Figure 36C:
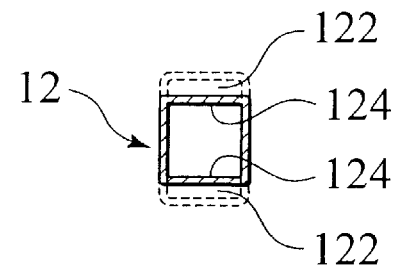
FIG. 36C is a sectional view taken along a line 36C—36C of FIG. 36A.
Figure 37B:
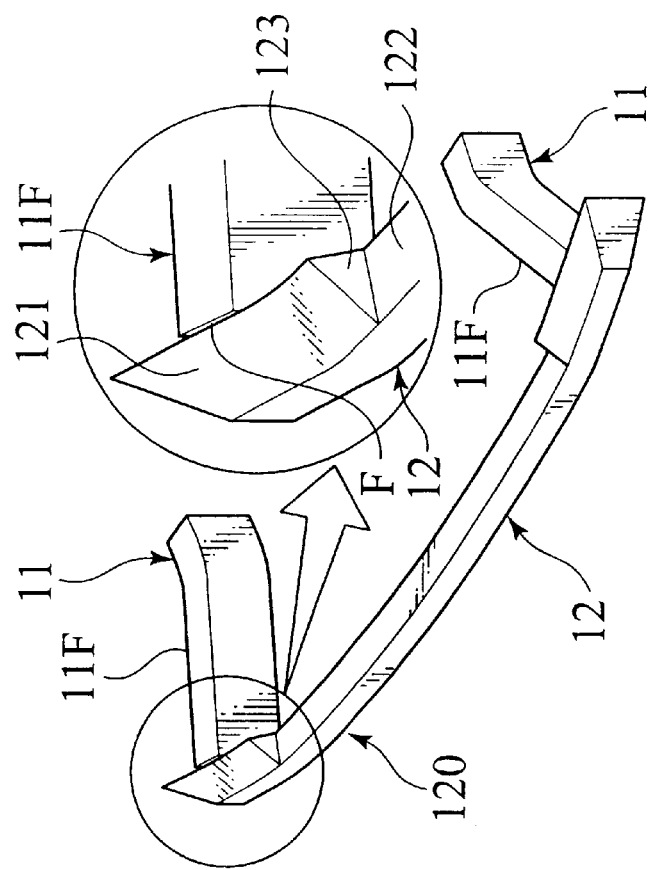
FIG. 37B is a perspective view showing the front body structure provided with the reaction force adjusting mechanism of the eighth embodiment of the invention.
Figure 37A:
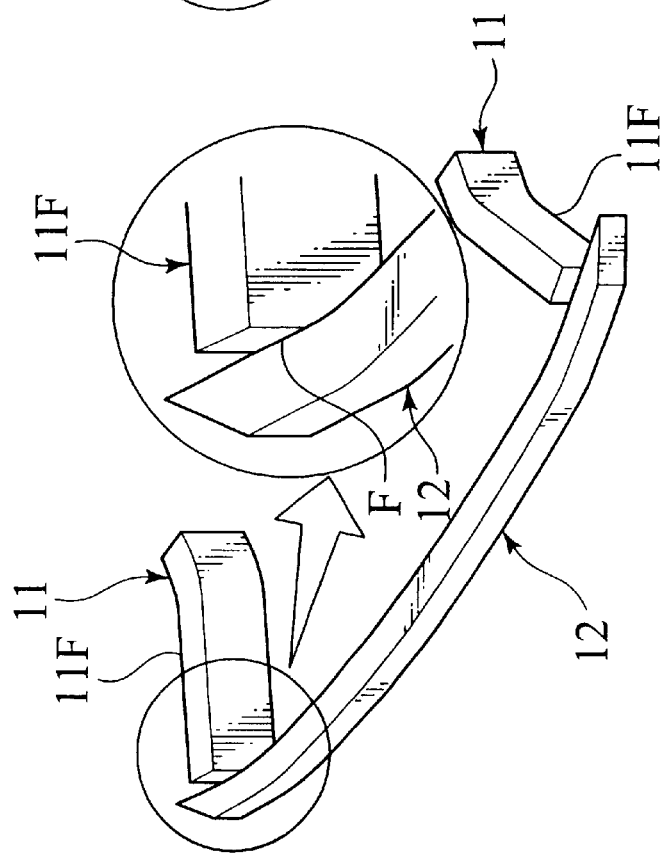
FIG. 37A is a perspective view showing the front body structure having no reaction force adjusting mechanism.

Alternatively, the bumper reinforcement 12 may be constructed by an extrusion of light alloy, as shown in FIGS. 36A to 36C. As to the manufacturing method, the bumper reinforcement 12 is firstly provided, in a closed section thereof, with a pair of partitions 124, by an extruder (not shown). Next, corresponding to the reduced-height area 122, upper and lower walls of the bumper reinforcement 12 are partially removed by means of e.g. machining, providing the reduced-height area 122 of FIG. 36C.

Figure 35:
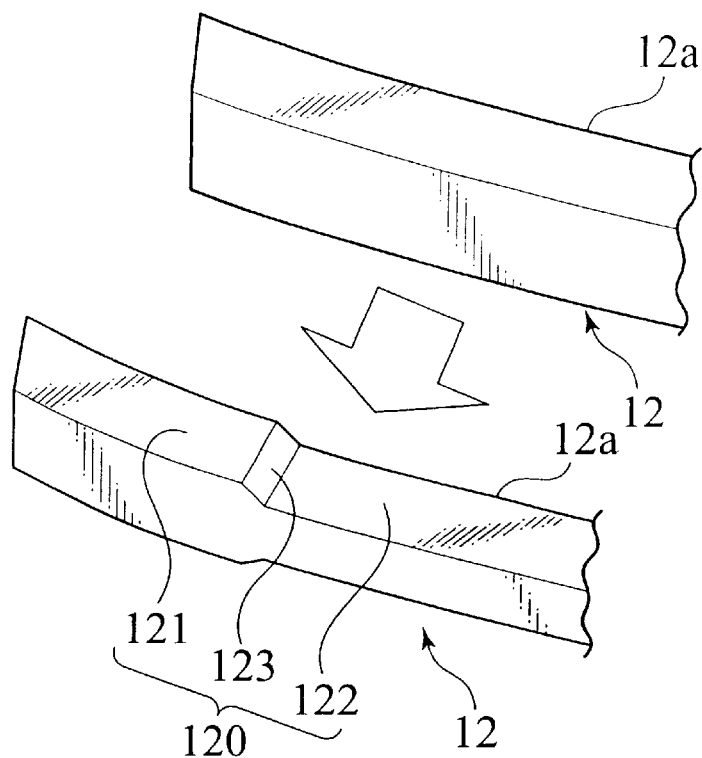
FIG. 35 is a view explaining one example of the technique of forming a bumper reinforcement forming the reaction force adjusting mechanism of the eighth embodiment of the invention.

Besides the above liquid-pressure forming method of FIG. 35 and the extruding/machining method of FIGS. 36A to 36C, the changed height part 120 may be formed by another "light alloy" extrusion having variable sections (not shown). Note that such an extrusion could be provided by extruding a material through a molding die having the final sectional shape.

[Effect]

According to the front body structure of the eighth embodiment, when a static collision load F is exerted on the front end of the side member 11 from the front as shown in FIG. 29, there are established the above-mentioned relationships among respective properties of the yield strength σ(y), the stress FY/A(y), the stress {FX×(L−y)}. Therefore, if the vehicle has a collision as one automotive dynamic phenomenon, then the front end (input point) of the side member 11 reaches the yielding area of the material to produce a plastic deformation. Consequently, when the collision load F is exerted to the side member 11, the forward area 11F of the side member 11 induces a collapse from the front end (as the input point) and subsequently, the collapse is continuously transmitted toward the rear side, whereby a collision energy can be absorbed certainly.

As mentioned above, since the forward area 11F is inclined outward in the width direction of the vehicle toward the front end of the side member 11, it is possible to allow the frontal collision to collapse the forward area 11F from its front end continuously, to mention nothing of the oblique-and-front collision.

Additionally, since the outward inclination of the forward area 11F allows the front end of the side member 11 to be positioned on the outer side in the vehicle body, it is possible to enlarge an input-bearing range established at the vehicle front end, in the width direction of the vehicle.

Noted that although the front collision allows the forward area 11F of the embodiment to be collapsed from the front end to the rear part continuously, there is a tendency for a reaction force of the side member 11 to increase in the vicinity of the reinforcement part 11R because of its high rigidity.

According to the embodiment, however, even when the interference point between the rear face 12a of the bumper reinforcement 12 and the side member 11 is shifted backward with the progress of collapse of the forward area 11F including the ridgelines 11g, 11h (see FIGS. 34A to 34C), it is possible to restrict the reaction force of the side member 11 from increasing in the latter half of the collapse K, owing to the provision of the changed height part 120.

That is, since the reduced-height area 122 of the changed height part 120 is arranged so as to correspond to the side face (central portion) 11b except the upper and lower ridgelines 11g, 11h of the side member 11, when the side face (central portion) 11b interferes with the reduced-height area 122 with the progress of the collapse K, the forward area 11F is subjected to a deformation beginning at the side face 11b of low rigidity, as shown in FIG. 34C. In this way, since the collapse K can be expedited while restricting the increase of reaction force, it is possible to attain an effective energy absorption.

Figure 38:
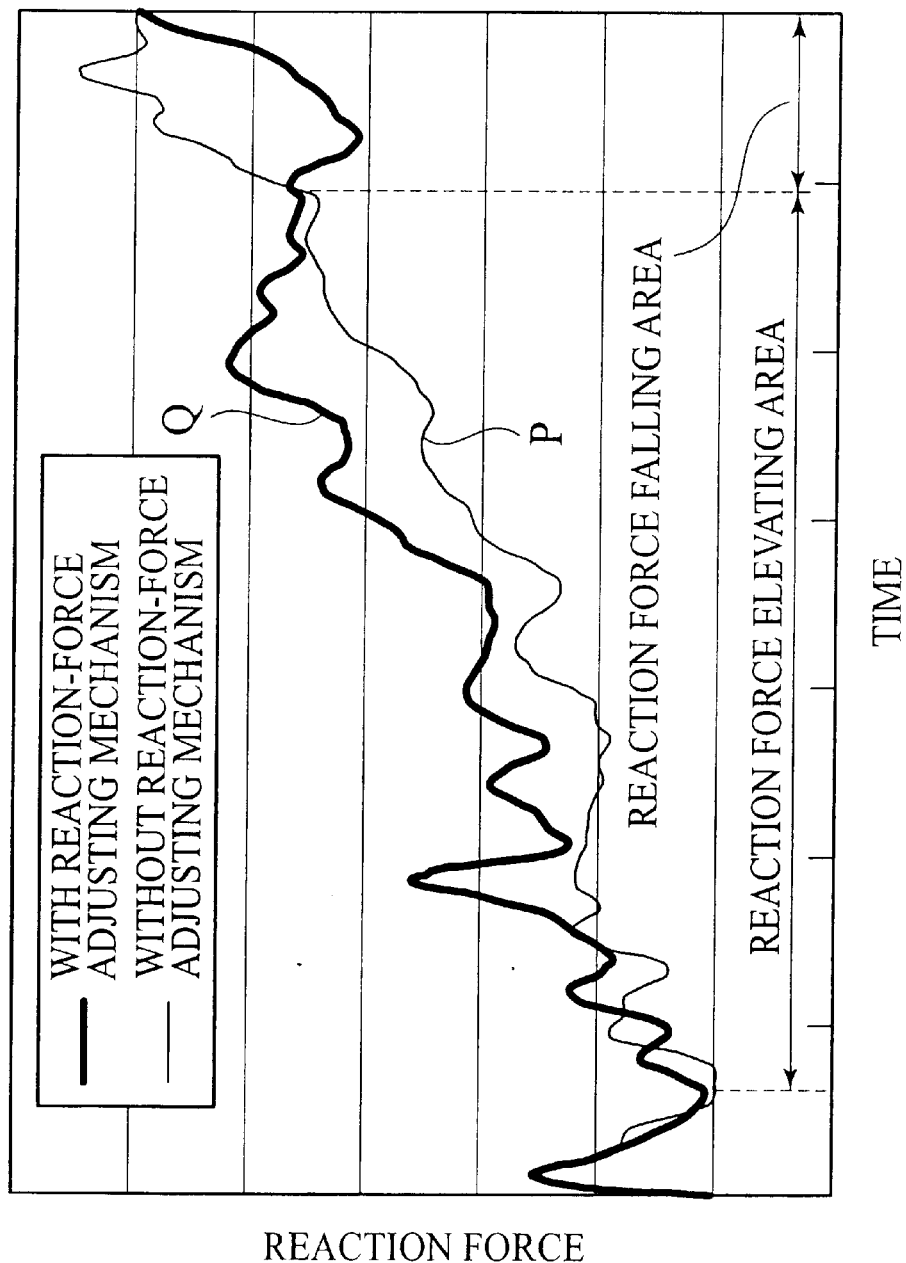
FIG. 38 is a comparative graph showing respective changes of reaction force depending on the presence of the reaction force adjusting mechanism of the eighth embodiment of the invention.

FIG. 38 shows a reaction-force characteristics P of the side member 11 in case of adopting the bumper reinforcement 12 having no changed height part and also another reaction-force characteristics Q of the side member 11 in case of adopting the bumper reinforcement 12 formed with the changed height part 120. From the figure, it will be understood that when the interference area between the forward area 11F and the bumper reinforcement 12 increases with the passage of time, a "reaction-force down" area capable of greatly reducing the reaction force can be ensured in the latter part of the collapse in accordance with the reaction-force characteristics Q.

Therefore, it is possible to cause the collapse K due to the interference between the bumper reinforcement 12 and the forward area 11F positively, whereby the energy of the collision load F can be absorbed by the side member 11 effectively.

According to the eighth embodiment, since the changed height part 120 forming the reaction force adjusting mechanism is provided by only changing the sectional heights h1, h2 of the bumper reinforcement 12, it is possible to simplify the whole structure of the reaction force adjusting mechanism.

According to the embodiment, since the variable plate-thickness structure 110 is formed by the composite panel member 112 which is obtained by welding the plural plate members 111a, 111b, 111c, 111d, 111e, 111f having different thicknesses t1, t2, t3, t4, t5, t6 in a manner that the thicknesses gradually change, it is possible to control the maximum stress generated in the imaginary sections Ia, Ib, . . . , Ie extending in the longitudinal direction of the side member 11 approximately, whereby the collapse K from the front end of the forward area 11F can be induced with no hindrance and it is possible to form the forward area 11F with ease.

Further, since the variable plate-thickness structure 110 is provided by changing the sectional dimensions of the forward area 11F in the longitudinal direction of the side member 11, it is possible to easily control the maximum stress generated in the imaginary sections Ia, Ib, . . . , Ie when the collision load F is applied to the front end of the side member 11. Thus, the variable plate-thickness structure 110 facilitates the adjustment of balance in strength, whereby the collapse K at the collision can be induced from the front end of the forward area 11F certainly.

As to the number of plate members 111a, . . . , 111f, it is not limited to the number of this embodiment only. The number may be determined in accordance with the required collapse characteristics of the forward area 11F.

As to the maximum stress generated in the imaginary sections of the forward area 11F, although it is established that the maximum stress of the front part of each section is nearly equal to that of the rear part of the corresponding section (front part≈rear part) in the above-mentioned variable plate-thickness structure 110, the present invention is not limited to this embodiment only. Alternatively, it may be established that the maximum stress of the front part of each section is more than or close to that of the rear part of the corresponding section (front part≧rear part).

[9th. Embodiment]

Figure 39:
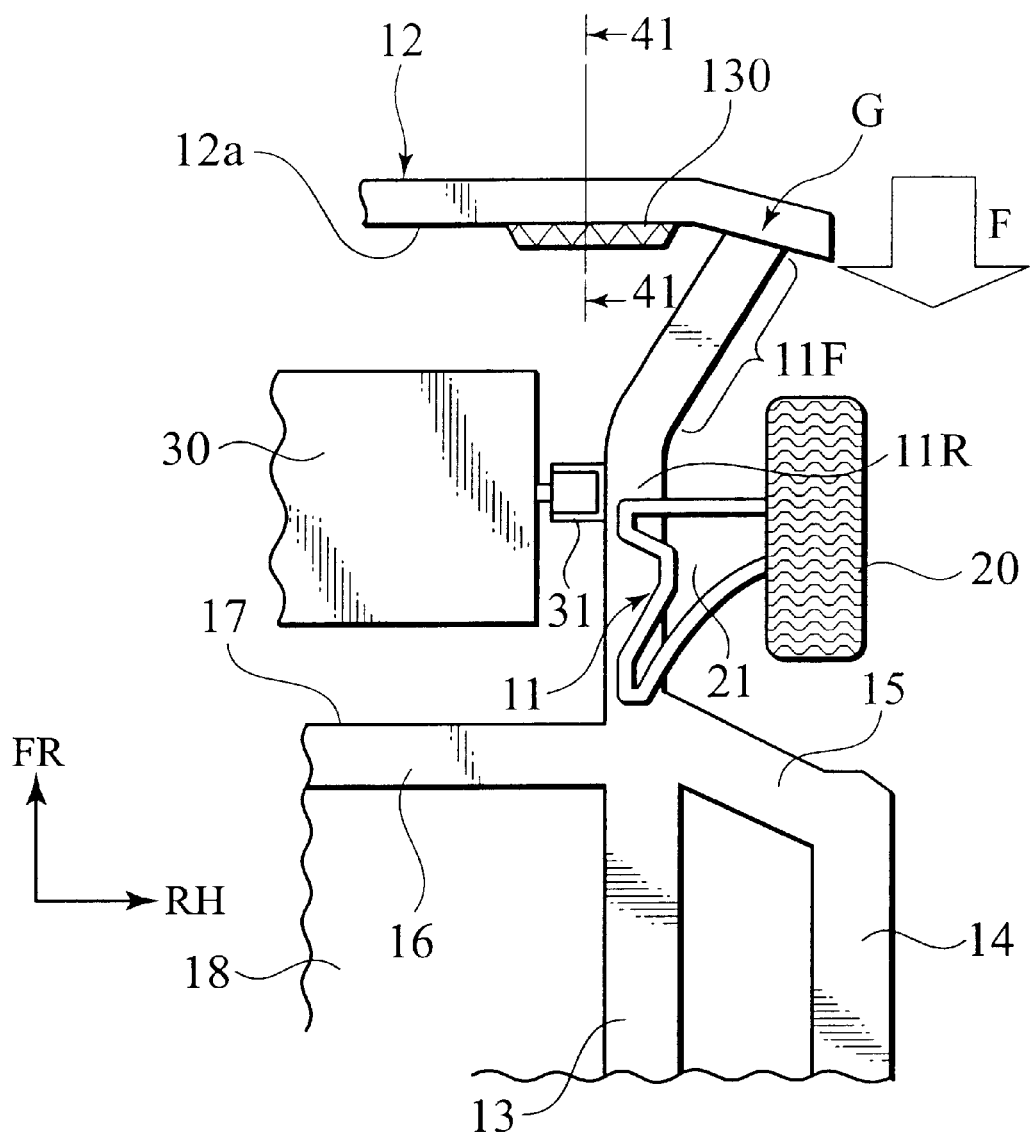
FIG. 39 is a schematic plan view showing a right-and-front framework of the front body structure in accordance with the ninth embodiment of the invention.

FIGS. 39 to 42 show the ninth embodiment of the present invention. Also in this embodiment, elements similar to those of the first embodiment are indicated with the same reference numerals respectively and their overlapping descriptions are eliminated. FIG. 39 is a plan view of the front body structure.

Figure 40:
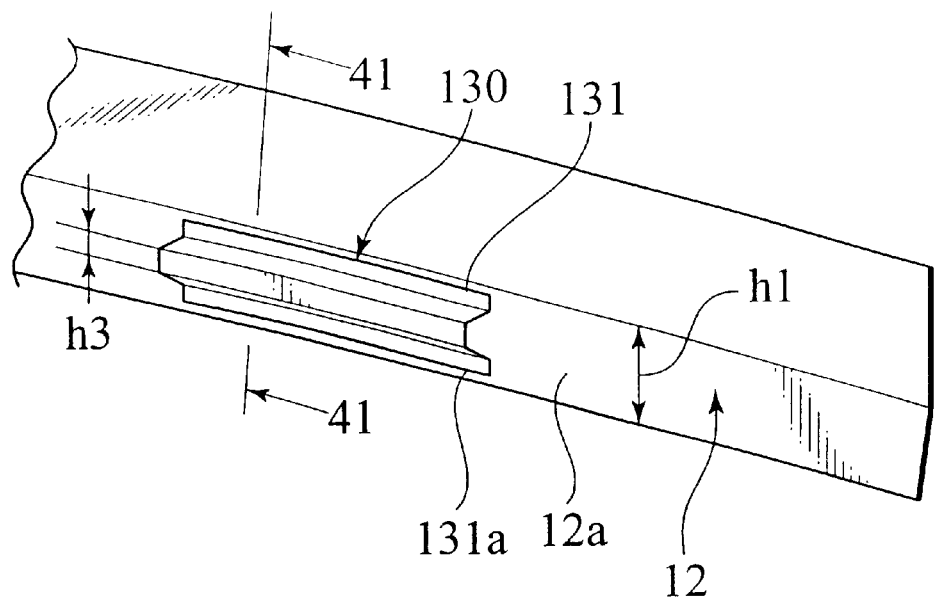
FIG. 40 is a perspective back view showing an essential part of the bumper reinforcement in the ninth embodiment of the invention.

According to the ninth embodiment, as shown in FIGS. 39 and 40, the bumper reinforcement 12 is provided, on the rear face 12a, with a projection 130 forming the reaction force adjusting mechanism which is similar to the eighth embodiment.

In this embodiment, the bumper reinforcement 12 is formed to have a sectional height "h1" substantially equal to or more than the sectional height "t0" of the side member 12 (see FIG. 30). The projection 130 on the bumper reinforcement 12 is arranged apart from the connecting part G by a predetermined distance. The projection 130 is formed to have a height "h3" less than the height "h0" of the side member 11. Similarly to the eighth embodiment, the projection 130 is arranged so as to correspond to the side face (central portion) 11b of the forward area 11F of the side member 11 except the upper and lower ridgelines 11g, 11h.

Figure 41:
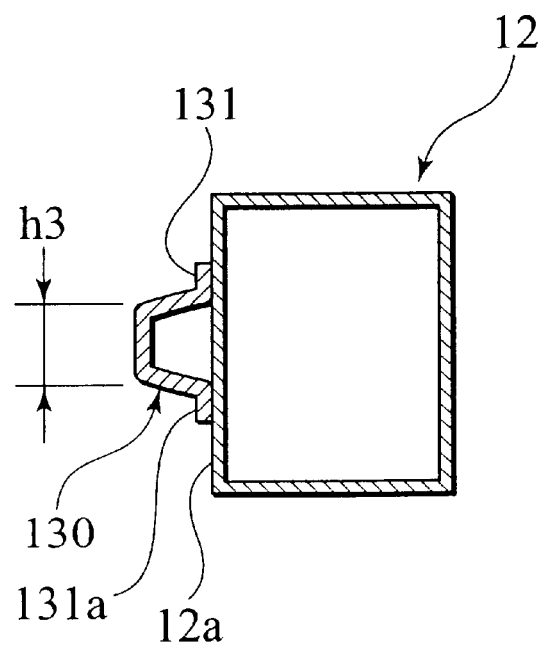
FIG. 41 is a sectional view taken along a line 41—41 of FIGS. 39 and 40.

As shown in FIG. 41, the projection 130 is shaped to be a channel member having a U-shaped section. Both end flanges 131, 131a of the projection 130 are continuously welded to the rear face 12a of the bumper reinforcement 12, at its intermediate part in the direction of height. Of course, the projection 130 is formed to have enough rigidity to collapse the side member 11 at its interference with the projection 130.

Figure 42:
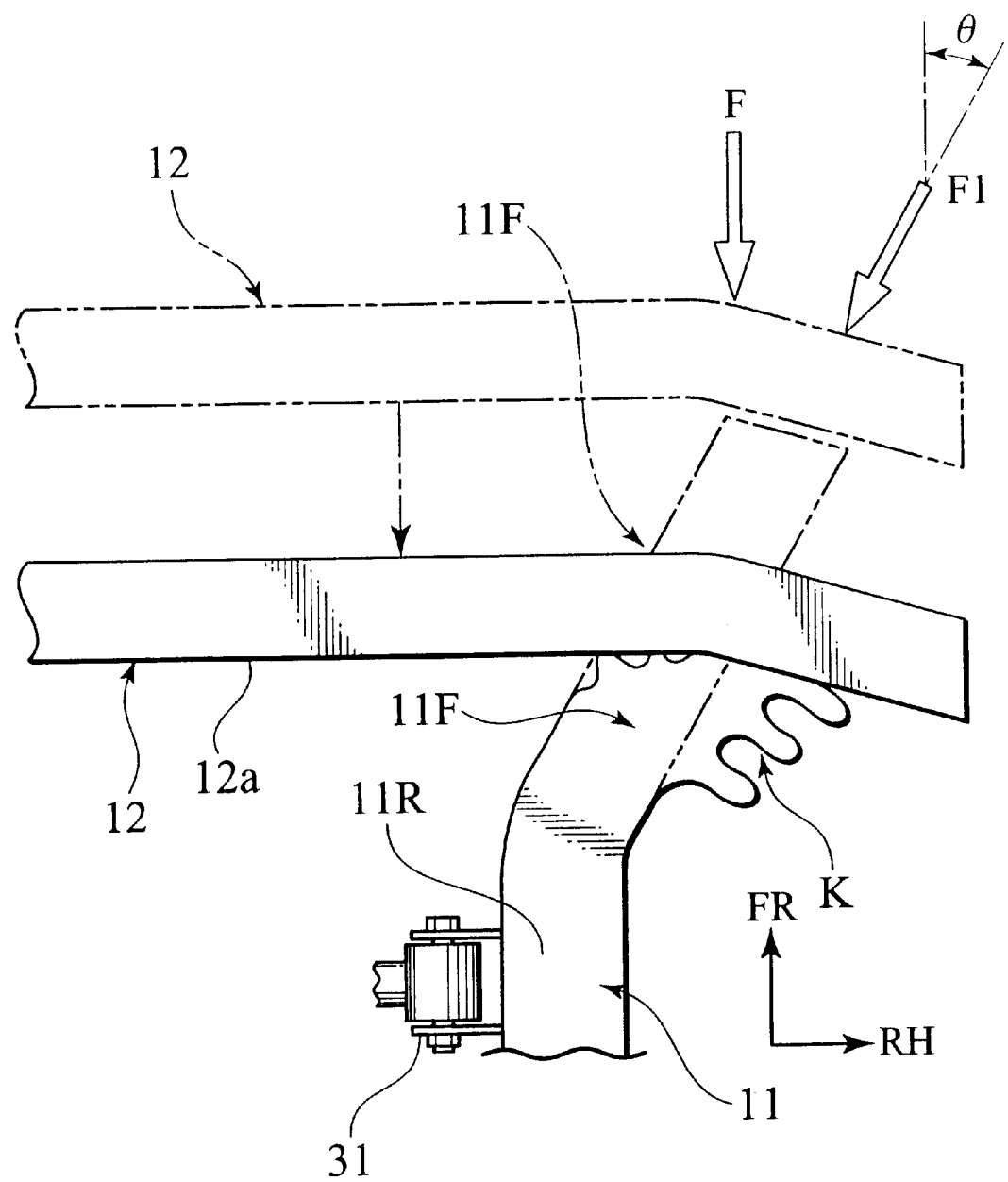
FIG. 42 is a schematic plan view showing the deformation of the forward area of the front body structure in accordance with the ninth embodiment of the invention.

Accordingly, as shown in FIG. 42, if the collision load F is applied to the vehicle from the front or the collision load F1 is applied to the vehicle obliquely from the front, then the forward area 11F firstly interferes with the bumper reinforcement 12 having the large sectional height "h1", causing a collapse K of the whole section including the ridgelines 11c, 11d of the closed-sectional side member 11, as similar to the eighth embodiment.

Subsequently, with the progress of the collapse K, the side member 11 is brought into the interference with the projection 130, so that the forward area 11F is subjected to a deformation beginning at the side face 11b of low rigidity. In this way, since the collapse K can be expedited while restricting the increase of reaction force, it is possible to attain an effective energy absorption.

According to the embodiment, the bumper reinforcement 12 is formed to have the sectional height "h1" substantially equal to or more than the sectional height "h0" and the projection 130 is fixed on the rear face 12a of the so-formed bumper reinforcement 12, providing the reaction force adjusting mechanism. Therefore, it is possible to simplify the structure of the front body structure without applying a complicated mechanical processing on the bumper reinforcement 12.

In common with the above-mentioned embodiments, owing to the provision of a variety of strength adjusting mechanisms for adjusting the maximum stress of the side member, it is possible to disperse the collision load on the side members on both sides of the vehicle effectively in spite of the front collision from any direction against the vehicle, whereby the absorbing efficiency of collision energy can be enhanced.

Finally, it will be understood by those skilled in the art that the foregoing descriptions are nothing but some embodiments of the disclosed front body structure for a vehicle. Besides these embodiments, various changes and modifications may be made to the present invention without departing from the spirit and scope of the invention.

Japanese Patent Application Numbers 2001-347573 (filed on Nov. 13, 2001), 2001-371738 (filed on Dec. 5, 2001) and 2001-371704 (filed on Dec. 5, 2002) are expressly incorporated herein by reference in its entirety.

The scope of the invention is defined with reference to the following claims.

What is claimed is:

1. A front body structure for a vehicle, comprising:
    a pair of side members arranged on both sides of a front compartment of the vehicle to extend in a fore-and-aft direction of the vehicle, the side members each including a reinforcement part for supporting a vehicle unit component; and
    a strength adjusting mechanism arranged in a forward area in front of the reinforcement part, for adjusting strength of the forward area so that, as to a maximum value of a sum of a stress of axial-force component and a stress of moment component both generated in respective imaginary sections continuing in a longitudinal direction of the forward area, the maximum value of front part of each imaginary section is substantially equal to that of rear part of the same imaginary section.

2. A front body structure of claim 1, wherein the strength adjusting mechanism adjusts respective maximum stresses generated in both front part and rear part of each one of the imaginary sections.

3. The front body structure of claim 2, wherein the strength adjusting mechanism adjusts a strength of the side member so that the maximum stress generated in the front part of each one of imaginary sections continuing in the longitudinal direction of the side member becomes less than the maximum stress generated in the rear part of the each one of imaginary sections.

4. The front body structure of claim 2, wherein
the maximum stress of the strength adjusting mechanism primarily determined by a yield strength of a material forming the side member.

5. The front body structure of claim 2, wherein
the strength adjusting mechanism comprises a variable plate-thickness structure that allows a plate thickness of the side member in the forward area to change in the longitudinal direction of the side member.

6. The front body structure of claim 5, wherein the variable plate-thickness structure is formed by a composite panel member having a plurality of plate members of different plate thicknesses, welded to each other so that the thicknesses change in a step manner, the composite panel member being arranged so that a direction to change the plate thicknesses coincides with the longitudinal direction of the side member.

7. The front body structure of claim 2, wherein
the strength adjusting mechanism comprises a variable partition-thickness structure wherein a plurality of partitions are arranged in a closed section of the forward area in the longitudinal direction of the side member at appropriate intervals, the partitions having their plate thicknesses changed in the longitudinal direction of the side member.

8. The front body structure of claim 2, wherein
the strength adjusting mechanism comprises a variable sectional-dimension structure that allows sectional dimensions in the forward area of the side member to change in the longitudinal direction of the side member.

9. The front body structure of claim 2, wherein the forward area of the side member is formed by an extrusion whose plate thickness and sectional dimensions are changeable in an extruding direction of the extrusion continuously, the strength adjusting mechanism comprising the extrusion having at least either one of the plate thickness and the sectional dimensions changes in an extruding direction of the extrusion continuously.

10. The front body structure of claim 2, wherein the maximum stress defined by the strength adjusting mechanism is established by a value which is calculated on the assumption that an oblique input acts on the front end of the side member statically and also calculated on the consideration of both a stress of axial-force component and a stress of moment component both generated in the respective imaginary sections continuing in the longitudinal direction of the forward area.

11. The front body structure of claim 2, wherein
the forward areas of the side members are formed straightly in the fore-and-aft direction of the vehicle and arranged in parallel with each other.

12. The front body structure of claim 2, wherein
the bumper reinforcement is formed to have a closed section and it is established that:
a section modulus "Z" of the second moment of area of the closed-sectional bumper reinforcement becomes more than the product of a maximum reaction force "max" when the front part of the side member collapses multiplied by the quotient that a span "L" of the forward area divided by a yield stress "σy-bmpr" of constituent materials of the bumper reinforcement, (Z>Fmax×L /σy- bmpr); and
a strength "Sjoint" of a joint part of the bumper reinforcement becomes more than the product of the maximum reaction force "Fmax" multiplied by the span "L", (Sjoint>L×Fmax).

13. The front body structure of claim 2, wherein the strength adjusting mechanism adjusts a strength of the side member so that the maximum stress generated in the front part of each one of imaginary sections continuing in the longitudinal direction of the side member becomes more than or close to the maximum stress generated in the rear part of the each one of imaginary sections.

14. The front body structure of claim 13, wherein
the forward areas of the side members are formed so as to incline outward in a width direction of the vehicle toward the front of the vehicle.

15. The front body structure of claim 14, further comprising a reaction force adjusting mechanism arranged, in a width direction of the vehicle, on the inside of a connecting part of the bumper reinforcement with each of the side members to restrict an increase of a reaction force of the side member when the side member interferes with the bumper reinforcement since a front collision load causes the side member to collapse from a front end thereof successively.

16. The front body structure of claim 15, wherein the reaction force adjusting mechanism comprises the bumper reinforcement including:
an increased-height area formed in the vicinity of the connecting part with a height substantially equal to or more than a height of a section of the side member; and
a reduced-height area inward formed apart from the connecting part by a predetermined distance with a height less than the height of the section of the side member, the reduced-height area obliquely confronting the side face of the forward area of the side member but upper and lower ridgelines thereof.

17. The front body structure of claim 15, wherein the reaction force adjusting mechanism comprises:
the bumper reinforcement formed to have a height substantially equal to or more than a height of a section of the side member; and
a projection formed on a rear face of the bumper reinforcement apart from the connecting part by a predetermined distance, to have a height less than the height of the section of the side member, the projection obliquely confronting the side face of the forward area of the side member but upper and lower ridgelines thereof.

18. A front body structure of claim 1, wherein
the strength adjusting mechanism adjusts a strength of the side member so that the maximum stress generated in the front part of each one of imaginary sections continuing in the longitudinal direction of the side member becomes more than or close to the maximum stress generated in the rear part of the each one of imaginary sections.

19. A front body structure of claim 1, wherein
the strength adjusting mechanism adjusts respective maximum stresses generated in both front part and rear part of each one of the imaginary sections, the strength adjusting mechanism comprises a plurality of members which have the same yield strength.

20. The front body structure of claim 1, wherein
the strength adjusting mechanism adjusts strength of the forward area so that respective upper limits of the maximum values each coincides with a yield strength of the constituent material of the side member.

21. A front body structure for a vehicle, comprising:
a pair of side members arranged on both sides of a front compartment of the vehicle to extend in a fore-and-aft direction of the vehicle, each of the side members including a reinforcement part for supporting a vehicle unit component; and means for adjusting strength of the forward area so that, as to a maximum value of a sum of a stress of axial-force component and a stress of moment component both generated in respective imaginary sections continuing in a longitudinal direction of the forward area, the maximum value of front part of each imaginary section is substantially equal to that of rear part of the same imaginary section, the means being arranged in a forward area in front of the reinforcement part of each of the side members.

* * * * *